(12) United States Patent
Chaffee

(10) Patent No.: US 6,508,264 B2
(45) Date of Patent: *Jan. 21, 2003

(54) VALVE FOR INFLATABLE OBJECTS

(76) Inventor: Robert B. Chaffee, 78 Montgomery St., Boston, MA (US) 02116

(*) Notice: Subject to any disclaimer, the term of this patent is extended or adjusted under 35 U.S.C. 154(b) by 0 days.

This patent is subject to a terminal disclaimer.

(21) Appl. No.: 09/867,071

(22) Filed: May 29, 2001

(65) Prior Publication Data

US 2002/0083975 A1 Jul. 4, 2002

Related U.S. Application Data

(63) Continuation of application No. 09/230,066, filed as application No. PCT/US97/12231 on Jul. 14, 1997, now Pat. No. 6,237,621.
(60) Provisional application No. 60/022,151, filed on Jul. 19, 1996.

(51) Int. Cl.[7] .................. F16K 15/18; F16K 15/20; F16K 31/44
(52) U.S. Cl. .................. 137/223; 137/232; 137/527; 137/854; 251/82; 251/297
(58) Field of Search ................ 137/223, 232, 137/233, 527, 843, 854, 855; 251/82, 297

(56) References Cited

U.S. PATENT DOCUMENTS

| | | |
|---|---|---|
| 679,519 A | 7/1901 | Smith |
| 827,823 A | 8/1906 | Starr |
| 1,185,684 A | 6/1916 | Schweinert |
| 2,482,198 A | 9/1949 | Melichar |
| 2,595,406 A | 5/1952 | Popovich |
| 2,767,735 A | 10/1956 | Darling |
| 2,803,527 A | 8/1957 | Lundahl |
| 3,086,698 A | 4/1963 | Goldstein |
| 3,785,395 A | 1/1974 | Andreasson |
| 3,995,653 A | 12/1976 | Mackal et al. |
| 4,515,872 A | 5/1985 | Okano |
| 4,579,141 A | 4/1986 | Arff |
| 4,678,014 A | 7/1987 | Owens et al. |
| 4,751,452 A | 6/1988 | Kilmer et al. |
| 5,184,309 A | 2/1993 | Simpson et al. |
| 5,343,889 A | 9/1994 | Jaw |
| 5,535,849 A | 7/1996 | Few |
| 5,962,159 A | 10/1999 | Satou et al. |
| 6,237,621 B1 * | 5/2001 | Chaffee .................. 137/223 |

FOREIGN PATENT DOCUMENTS

| | | |
|---|---|---|
| DE | 2554719 A1 | 6/1977 |
| DE | 2701556 A1 | 7/1978 |
| EP | 0852296 A2 | 7/1998 |

* cited by examiner

*Primary Examiner*—John Rivell
(74) *Attorney, Agent, or Firm*—Wolf, Greenfield & Sacks, P.C.

(57) ABSTRACT

A self-sealing valve is used to fill, empty, and control the volume of fluid within an inflatable device. The valve includes a housing having a fluid inlet, a valve seat and a valve assembly that selectively covers the fluid inlet to provide a self-seal. The valve assembly includes a support member that suspends a flexible diaphragm in a closed position within the valve housing while allowing movement of at least part of the periphery of the diaphragm away from the valve seat to an open position and back towards the valve seat to a closed position. The support member may be manually moved to any of the multiple open positions, either to enable fluid release or to enhance fluid injection. With the injection of fluid, the diaphragm assumes an open position, allowing fluid influx. A fluid pressure created within the device assists in maintaining the diaphragm in the closed position.

27 Claims, 27 Drawing Sheets

VALVE FOR INFLATABLE OBJECTS

RELATED APPLICATION

This application is a continuation and claims priority under 35 U.S.C. §120 to commonly-owned, U.S. patent application Ser. No. 09/230,066, entitled "Valve for Inflatable Objects," filed Jan. 19, 1999, and issued on May 29, 2001 as U.S. Pat. No. 6,237,621, which claims priority under 35 U.S.C. §371(e) to International Application No. PCT/US97/12231, entitled, "Valve for Inflatable Objects," filed Jul. 14, 1997, and under 35 U.S.C. §119(e) U.S. Provisional Patent Application Ser. No. 60/022,151 entitled, "A Switchable Inflation Device," filed Jul. 19, 1996, which is hereby incorporated by reference in its entirety.

FIELD OF THE INVENTION

This invention relates to a self-sealing valve and, more particularly, to any low pressure inflatable device that includes the self-sealing valve.

BACKGROUND OF THE INVENTION

U.S. Pat. No. 5,267,363 (hereinafter the "'363 patent) and U.S. Pat. No. 5,367,726 (hereinafter the "'726 patent") disclose a valve and a motor for inflating and deflating inflatable objects. FIG. 62 illustrates a top view and FIG. 63 illustrates a cross-sectional view of an embodiment of dual-valve assembly disclosed in the '363 and '726 patents. The valve includes a flange 152 that may be mounted to a wall of an inflatable body in a location proximate to a port through which air is transferred between an interior and an exterior of the inflatable body. The flange 152 has a throat 1521 through which all air passes that is being transferred between the interior and the exterior of the inflatable body. The throat 1521 is defined by a circular rim 1522. In addition, a cover assembly 153 including a cap 1533 is used to removably cover the throat 1521. A ring-shaped base 1531 is disposed around an exterior of the circular rim. The cap 1533 is attached to the base by means of a hinge assembly 1532. The cap may be latched into a closed position by a latching arrangement including a latch projection 1535 on the cap and latch receptacle 1536 on the base. When the cap is closed, a gasket 1534 is urged against the top 1523 of the rim 1522 so that the gasket is submitted to compression, to seal the dual-valve assembly.

Disposed within the dual-valve assembly 153 is a valve assembly 154. The valve assembly includes a diaphragm 1544 and valve stem 1547. The valve stem and the diaphragm are supported by a valve stem support 1549 which is attached to the cap 1533. The dual-valve assembly also includes a structure defining an inflation input 1542 and a valve seat 1543, that the diaphragm rests against in a closed position to further form a seal of the dual-valve assembly. The diaphragm can be accessed by an individual at the inflation input and can be pushed axially within the dual-valve assembly in a downward direction into an open position by pressing on a push button 1546. The diaphragm is urged into the closed position when the push button is released by a spring 1548, disposed within the valve stem, that pushes against a portion of the valve stem support.

Thus, the '363 and '726 patents disclose a valve that can be used to inflate and deflate an inflatable device wherein the diaphragm moves downward in an axial direction towards an interior of the inflatable device away from the valve seat during inflation and that moves upward in an axial direction towards the valve seat to seal the valve. However, the dual-valve assembly disclosed in the '363 and '726 patents is approximately 4"×5" and therefore requires substantial space for mounting within an inflatable object. However, many inflatable objects cannot accommodate a valve assembly of this size and therefore there is a need for a smaller valve assembly that can be mounted within smaller inflatable objects. In addition, many inflatable devices have a contoured surface and therefore there is a need for a valve that can be mounted on a contoured surface area. Further, the dual-valve of the '363 and '726 patents requires nine separate parts to be manufactured and assembled and therefore is costly and difficult to manufacture, assemble and maintain. Therefore, there is a need for a valve that requires less parts, is cheaper to manufacture and assemble, and is easy to maintain. Moreover, the dual-valve disclosed in the '363 and '726 patents has redundant devices for sealing the valve which contribute to the excessive parts and cost. Therefore, there is a need for a valve that provides a suitable seal that does not require redundant structure to accomplish the self-seal. Still further, since the valve is to be inserted within an inflatable device, there is a need for the valve to be easy to use and easy to clean and/or repair.

Accordingly, it is an object of the present invention to provide a self-sealing valve assembly for use in inflatable devices.

SUMMARY OF THE INVENTION

According to one embodiment of the present invention, a self-sealing valve includes a valve housing that has a fluid inlet. The valve housing is configured so that all fluid being transferred between an interior and an exterior of the valve housing passes through the fluid inlet. The self-sealing valve also includes a valve assembly that selectively covers the fluid inlet to provide a self-sealing pneumatic seal. The fluid inlet is defined by an inner wall of the valve housing and the valve housing also includes a valve seat substantially facing the interior of the valve housing. The valve assembly includes a hanger arm attached at a first end of the hanger arm to the inner wall of the valve housing via a hinge assembly disposed between the first end of the hanger arm and the inner wall. The hanger arm has a second end that may be moved about the hinge point of the hinge assembly in a first direction from a closed position towards the interior of the valve housing to an open position and that may also be moved about the hinge point in a second direction, opposite of the first direction, from the open position to the closed position. The valve assembly further includes a flexible diaphragm having an area larger than an area of the fluid inlet, having a first surface facing the interior of the valve housing and having a second surface facing the exterior of the valve housing. The flexible diaphragm is mounted to the hanger arm to allow movement of at least a part of a periphery of the flexible diaphragm in the first direction towards the interior of the valve housing away from the valve seat to the open position and also to allow movement of at least that part of the periphery of the flexible diaphragm in the second direction so that the periphery of the flexible diaphragm engages against the valve seat in the closed position.

This embodiment of the self-sealing valve assembly may be removably attached to a wall of an inflatable body proximate to a port for transferring fluid between an interior and an exterior of the inflatable body so that fluid being transferred between the interior and the exterior of the inflatable body passes through the fluid inlet of the self-sealing valve. With this arrangement, an act of inflation of the inflatable body will cause at least one part of the periphery of the flexible diaphragm and the second end of the hanger arm to move in the first direction into the open position to permit an influx of fluid into the inflatable body. In addition, fluid pressure created within the inflatable body will be sufficient to cause at least that part of the periphery of the flexible diaphragm and the hanger arm to move in the second direction to the closed position when there is an absence of the influx of fluid. In addition, with this arrangement, the self-sealing valve assembly automatically opens to allow pressurization of the inflatable device, automatically closes to retain pressurization of the inflatable device, and maintains a pneumatic seal at low pressures within the inflatable device. Further, the self-sealing valve assembly is easy to use and maintain and the floating diaphragm can be easily manipulated to deflate the inflatable object. Moreover, the self-sealing valve assembly is small and thus can be used in small inflatable objects and/or on contoured surfaces of inflatable devices. Still further, the self-sealing valve has few parts and thus can be manufactured inexpensively.

This embodiment of the self-sealing valve may also be provided with a device for locking the hanger arm and at least a part of the periphery of the flexible diaphragm in a locked open position. In addition, this embodiment may be provided with structure that releases the hanger arm and at least that part of the periphery of the flexible diaphragm from the locked open position to allow the hanger arm and flexible diaphragm to move to the closed position.

This embodiment of the self-sealing valve may also be provided with structure for reducing any flexing of the flexible diaphragm except for at least that part of the periphery of the flexible diaphragm that moves to the open position.

This embodiment of the self-sealing valve assembly may also be provided with structure for preventing movement of the hanger arm and the flexible diaphragm in the second direction past the closed position such as, for example, out of the fluid inlet.

This embodiment of the self-sealing valve may also be provided with structure for removably connecting the valve to any inflation or deflation device.

This embodiment of the self-sealing valve may also be provided with a cover that is retainably secured to the self-sealing valve, for selectively protecting and exposing the fluid inlet of the self-sealing valve.

This embodiment of the self-sealing valve may also be provided with structure for easily installing and/or removing the hanger arm and the flexible diaphragm combination from the self-sealing valve housing so as to easily fix and/or maintain the self-sealing valve.

Another embodiment of a self-sealing valve according to the present invention includes a valve housing having a fluid inlet defined by an inner wall and a valve assembly that selectively covers the fluid inlet to provide a pneumatic self-seal. The valve housing includes a valve seat facing an interior of the valve housing and the valve housing is configured to require fluid being transferred between the interior and an exterior of the valve housing to pass through the fluid inlet. The valve assembly includes a support member that suspends a flexible diaphragm in a floating position within the valve housing to allow movement of at least a part of a periphery of the flexible diaphragm in a first direction away from the valve seat to an open position and to allow movement of at least that part of the periphery of the flexible diaphragm in a second direction, opposite of the first direction, so that the periphery of the flexible diaphragm engages against the valve seat in a closed position. The flexible diaphragm has a surface area larger than an area of the fluid inlet, has a first surface facing the interior of the valve assembly, and has a second surface facing the exterior of the valve assembly. The second surface of the flexible diaphragm includes the periphery of the flexible diaphragm that engages against the valve seat to provide the pneumatic self-seal. The valve assembly further includes structure for mounting the flexible diaphragm to the support member and for allowing manual movement of at least that part of the periphery of the flexible diaphragm in the first direction into the valve housing so as to purge the self-sealing valve.

This embodiment of the self-sealing valve assembly may be removably attached to a wall of an inflatable body proximate to a port for transferring fluid between an interior and an exterior of the inflatable body so that all fluid being transferred between the interior and the exterior of the inflatable body passes through the fluid inlet of the self-sealing valve. With this arrangement, an act of inflation of the inflatable body will cause at least that part of the periphery of the flexible diaphragm to move in the first direction into the open position to permit an influx of fluid into the inflatable body. In addition, fluid pressure created within the inflatable body will be sufficient to cause at least that part of the periphery of the flexible diaphragm to move in the second direction to the closed position when there is an absence of the influx of fluid. In addition, with this arrangement, the self-sealing valve assembly automatically opens to allow pressurization of the inflatable device, automatically closes to retain pressurization of the inflatable device, and maintains a pneumatic seal at low pressures within the inflatable device. Further, the self-sealing valve assembly is easy to use and maintain and the floating diaphragm can be easily manipulated to deflate the inflatable object. Moreover, the self-sealing valve assembly is small and thus can be used in small inflatable devices and/or on contoured surfaces of inflatable devices. Still further, the self-sealing valve has few parts and thus can be manufactured inexpensively.

This embodiment of the self-sealing valve may include a hinge assembly disposed between one end of a hanger arm that suspends the flexible diaphragm in the floating position and the inner wall of the valve housing so that the hanger arm and the flexible diaphragm are pivoted in a downward direction into the valve housing to inflate and to purge an inflatable device.

This embodiment of the self-sealing valve may also include a hanger arm attached to the inner wall of the valve housing, the hanger arm having a slot including increased diameter openings at each end of the slot that allow a compressible handle of the flexible diaphragm to be retained within the increased diameter openings or moved in the sideways direction along the slot. This version may also include a spring-mounted hinge disposed between one end of the hanger arm and the inner wall of the valve housing and a latch assembly disposed between a second end of the hanger arm and the inner wall of the valve housing. With this arrangement, the hanger arm and the flexible diaphragm may be moved about the hinge point of the spring-mounted hinge in a direction towards the exterior of the valve assembly when the diaphragm handle has been moved sideways within the slot to one of the increased diameter openings to compress a spring of the spring-mounted hinge and unlatch the latch assembly. This embodiment of the self-sealing valve may include a retaining rib that extends across the fluid inlet of the valve housing between the valve seat. The retaining rib may include a vertical support post that extends into the fluid inlet towards the exterior of the self-sealing valve. The flexible diaphragm may include a handle disposed on the second surface of the flexible diaphragm and a tapered indentation disposed on the first surface of the flexible diaphragm. The tapered indentation mates with the support post of the retaining rib so that the handle of the flexible diaphragm can be grasped and the periphery of the flexible diaphragm can be pivoted in a downward direction into the valve housing about the support post to deflate an inflatable device.

This embodiment of the self-sealing valve may also include at least one rib attached to the inner wall of the valve assembly. The at least one rib may have a slot disposed therein and the diaphragm may have a mating rib projecting from the second surface. The mating rib may have a narrow section that mates with the slot and an enlarged section that secures the diaphragm to the rib. The diaphragm may also include a target area that pivots downward into the valve assembly under pressure applied to the target area to allow for inflation or deflation of an inflatable device.

An embodiment of a method of installing a hanger arm and flexible diaphragm within a self-sealing valve housing according to the invention includes the steps of providing the hanger arm having at least one projecting tab at a first end of the hanger arm including a seating hole disposed therein that is configured to mate with a hinge pin and having the flexible diaphragm mounted to the hanger arm so as to allow movement of at least a part of a periphery of the flexible diaphragm without any movement of the hanger arm. The hanger arm and flexible diaphragm are placed into a fluid inlet of the self-sealing valve housing so as to engage the seating hole against the hinge pin mounted on a first surface of a bracket secured to an inner wall of the fluid inlet. The hanger arm with the flexible diaphragm is pivoted in a downward direction into and through the fluid inlet of the self-sealing valve housing to a closed position. With this arrangement, the self-sealing valve can be easily maintained and a new hanger arm and flexible diaphragm may easily be installed in an existing self-sealing valve housing.

A check valve according to an embodiment of the invention includes a valve housing having a fluid inlet defined by an inner wall, the valve housing having a valve seat facing an interior of the valve housing and the valve housing being configured to require fluid being transferred between the interior and an exterior of the valve housing to pass through the fluid inlet. The check valve also has a valve assembly that selectively covers the fluid inlet. The valve assembly includes a support member, that suspends a flexible diaphragm in a floating position within the valve housing to allow movement of at least a part of a periphery of the flexible diaphragm in a first direction away from the valve seat to an open position and to allow movement of at least that part of the periphery of the flexible diaphragm in a second direction, opposite of the first direction, so that the periphery of the flexible diaphragm engages against the valve seat in a closed position. The valve assembly also includes the flexible diaphragm having an area larger than an area of the fluid inlet, having a first surface facing the interior of the valve housing and having a second surface facing the exterior of the valve housing, the second surface including the periphery of the flexible diaphragm that engages against the valve seat. In addition, the valve assembly includes structure for mounting the flexible diaphragm to the support member and for allowing manual movement of at least that part of the periphery of the flexible diaphragm in the first direction. With this arrangement, the check-valve can be used to seal an inflatable body and to control the flow of the fluid into the inflatable body.

BRIEF DESCRIPTION OF THE DRAWINGS

Other objects and features of the present invention will become apparent from the following detailed description when taken in connection with the following drawings. It is to be understood that the drawings are for the purpose of illustration only and are not intended as a definition of the limits of the invention.

The foregoing and other objects and advantages will be more fully appreciated from the following drawing in which.

DETAILED DESCRIPTION

Figure 64:
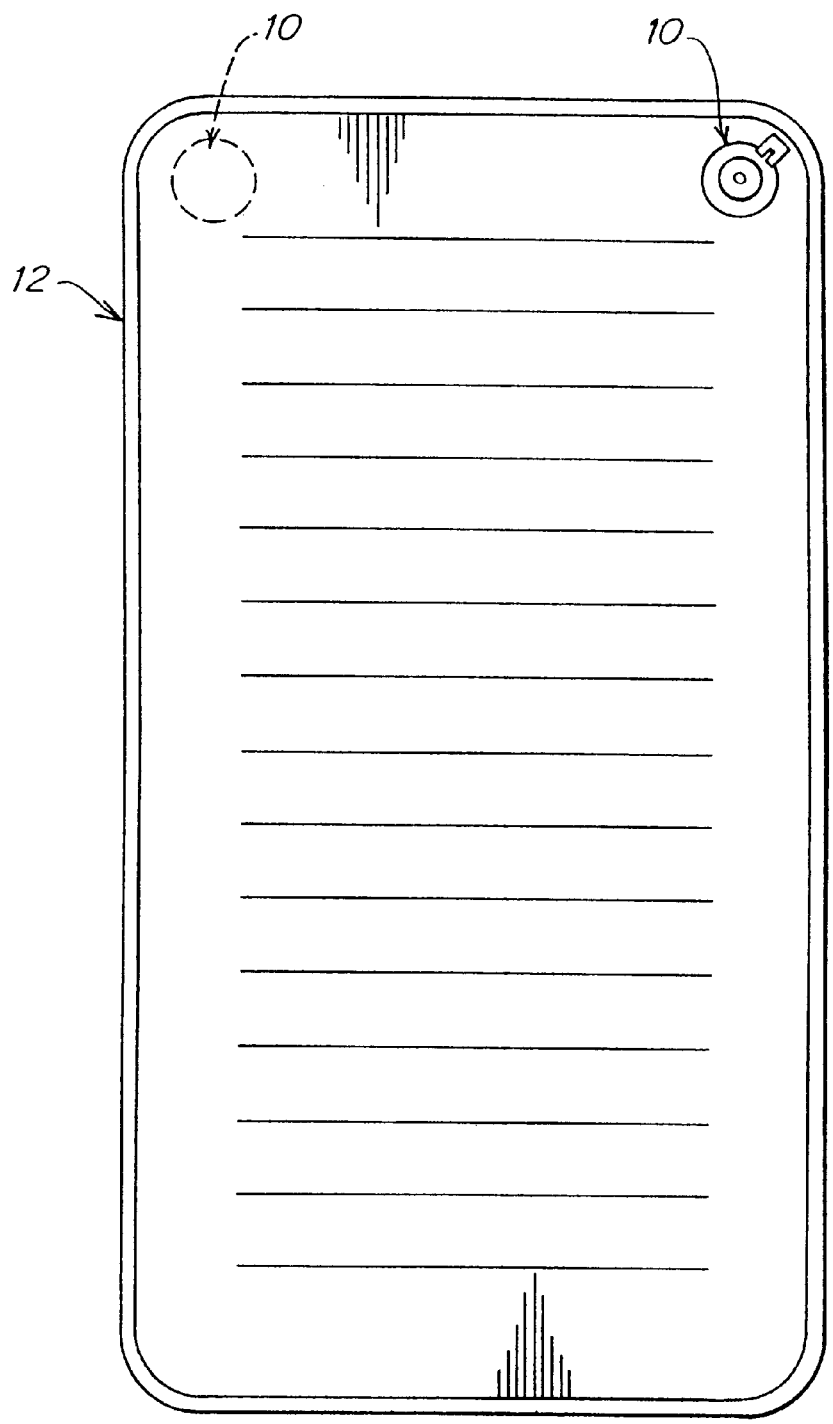
FIG. 64 illustrates an inflatable device in which any of the embodiments of the self-sealing valve of the present invention may be used.

A self-sealing valve of the present invention can be mounted within an inflatable object such as, for example, an inflatable mattress 12 having a self-sealing valve 10 as illustrated in FIG. 64. The mattress can be inflated, deflated, and a pressure of the mattress can be controlled using any of the self-sealing valves of the present invention disclosed infra. Although in the examples and description of the various embodiments of the self-sealing valve that follow, the description of inflation of the inflatable object refers to the use of air, it is to be appreciated that any suitable fluid may be used for inflation such as, for example, water or nitrogen, and that the use of such fluid with the self-sealing valve of the invention is within the scope of the invention. It is also to be appreciated that although a mattress is illustrated as an inflatable body for which any of the valves of the present invention may be used, the self-sealing valves may be used with any inflatable body such as, for example; inflatable furniture or sporting items such as chairs, mattresses and pillows; inflatable safety devices such as life preservers, barriers, bumpers, and pads; inflatable medical devices such as supports, casts and braces; inflatable luggage devices such as padding and luggage lining materials; inflatable recreational devices such as swimming aids, floats, tubes and rings; inflatable vehicles and vehicle components such as boats, rafts and tires; inflatable support structures such as buildings, portable enclosures, platforms, ramps and the like.

It is further to be appreciated that any of the valves disclosed infra according to the present invention can be used in connection with a motor such as that described in U.S. Pat. No. 5,267,363, (hereinafter the "'363 patent") and U.S. Pat. No. 5,367,726 (hereinafter the "726 patent") which are herein expressly incorporated by reference. Moreover it is to be appreciated that a preferred operating range of the self-sealing valves of the present invention is between approximately 0–10.0 psi. Further, according to the present invention a range of about 0–1.0 psi is defined as a low pressure range, a range of approximately 1.0–2.0 psi is defined as a medium pressure range and a range of approximately 2.0–10.0 psi is defined as a relatively high pressure range. It is to be appreciated that the preferred operating range has been defined to be up to 10.0 psi, any pressure above 10.0 psi at which the valve still provides a self-seal is intended to be within the scope of this invention Referring to FIG. 1, a valve 10 is seated in an inflatable object 12 that has an outer shell 14 that defines an interior 16. The interior is filled with a fluid or gas, typically air. Valve 10 has a molded plastic frame 20 that includes a circular flanged outer periphery 22 that is generally coplanar with shell 14. Preferably the valve is constructed of PVC or polyurethane, however, a more rigid and stronger material may be used for higher pressure applications. A valve wall 24 having a diameter less than that of outer periphery 22 defines a circular opening 26 through which air is transferred to and from the interior. At its outermost, the opening has a diameter that is preferably about one inch or greater. The wall 24 has a constant diameter portion 25 and an outwardly tapered portion 28 that increases the diameter of the opening to a circular, increased diameter portion 30. The upper edge of wall 24 has a radiused inner edge at its outermost end for comfort in case the object is inflated orally.

A retaining rib 36 extends across a diameter of increased diameter portion 30. Centrally located on the retaining rib is a vertical support post 38 which extends toward the circular opening 26. A floating diaphragm 40 rests on the support post. The diaphragm has a centrally located handle 42 at a top side, and a tapered indentation 44 on a bottom side that mates with support post 38. Thus, the rib provides stability and limits movement of the diaphragm toward the interior. Diaphragm 40 is generally circular, deformable, very flexible, and has a diameter that is slightly less than the inner diameter of the increased diameter region 30, and greater than the diameter of portion 25. Tapered portion 28 has an inwardly facing wall 29 that serves as a shoulder against which outer periphery 46 of the diaphragm may contact. Indentation 44 and support post 38 help keep the diaphragm centered.

Diaphragm 40 may optionally be connected to frame 20 through a tether 48, which may just be a flexible wire or sling other than this optional tether. The diaphragm is preferably not otherwise rigidly connected to any part of the rest of the valve.

Figure 1:
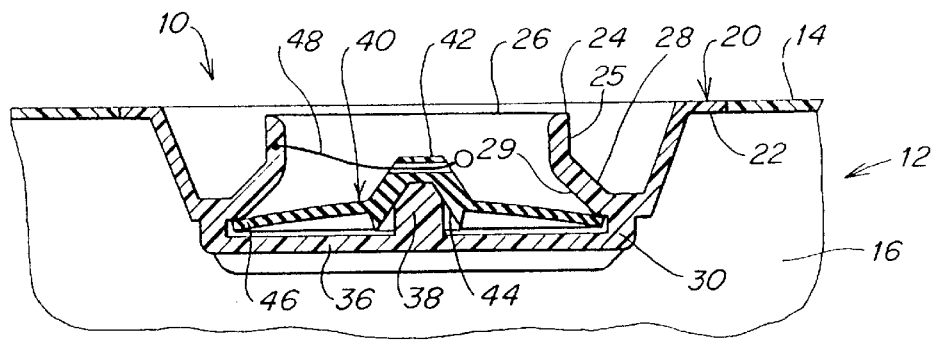
FIGS. 1–2 are cross-sectional side views of a first embodiment of a self-sealing valve attached to an inflatable body according to the present invention, wherein a diaphragm is in a sealed position.
Figure 2:
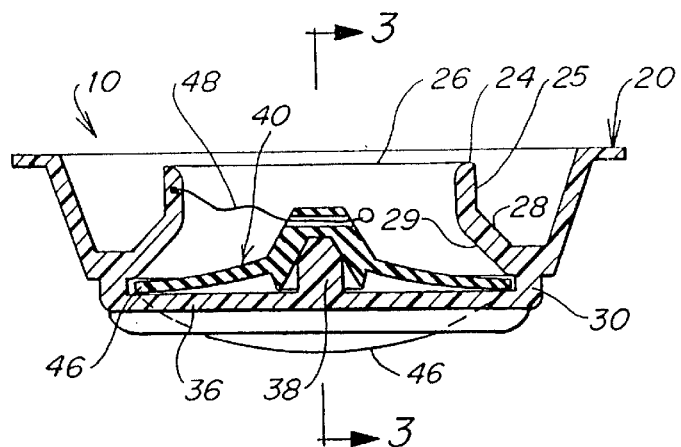
Figure 3:
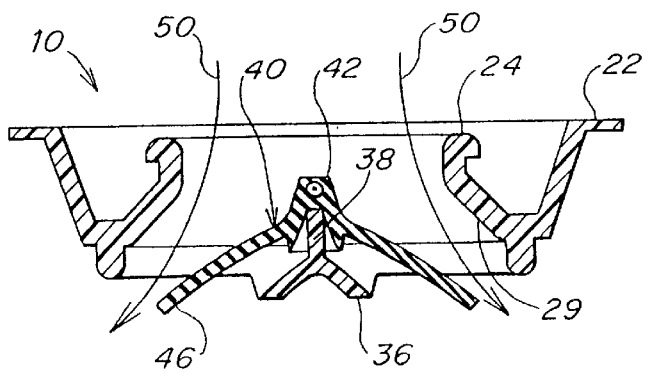
FIG. 3 is a front cross-sectional view taken along line 3—3 of FIG. 2 of the valve of FIGS. 1 and 2 illustrating an inflatable body being deflated.

Referring to FIGS. 2 and 3, the valve is illustrated during inflation. Referring first to FIG. 3, which is a view taken at 90° relative to FIGS. 1 and 2, air is provided along arrows 50. The air may be supplied by a motor, as with a hand or foot pump, or orally or with some other inflating device. The motor can be similar to the motor described in my U.S. Pat. No. 5,267,363. Because of the flexibility of diaphragm 40, periphery 46 bends relative to centered handle 42. As air is provided into the object, the diaphragm automatically bends inward, without additional user input, to allow the air flow into the interior of the object.

Figure 4:
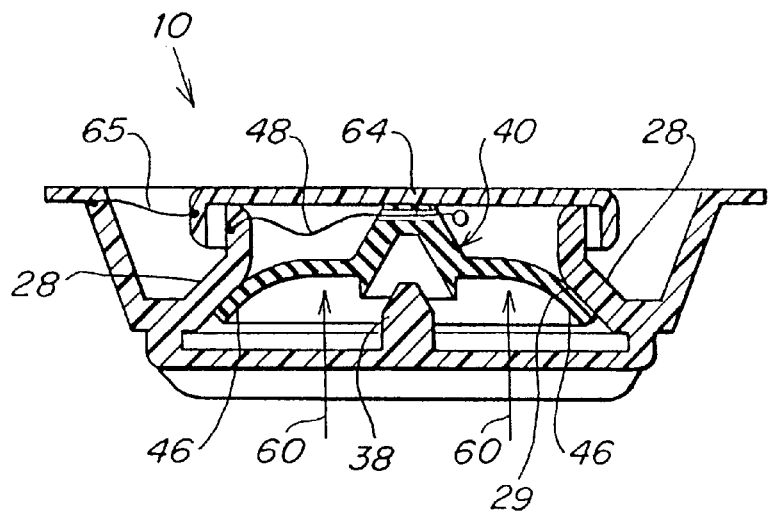
FIGS. 4 and 5 are a side cross-sectional view and a front cross-sectional view, respectively, corresponding to the valve of FIG. 1 illustrating the valve in the closed position under internal pressure of the inflatable device.
Figure 5:
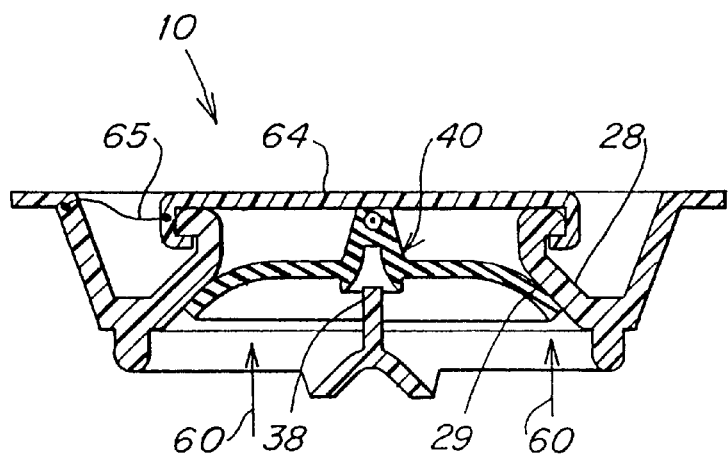

FIGS. 4 and 5 are views corresponding to FIGS. 2 and 3, respectively, when the inflatable object is under pressurization with air pressure represented by arrows 60. When air is no longer provided and the interior is under pressure, the pressure automatically pushes diaphragm 40 away from support post 38 so that periphery 46 is pressed against wall 29 of tapered section 28 of the frame. The diaphragm thus seated forms a hermetic seal when pressed against the frame. A cap 64 rib, or other rigid member can be further provided for slightly higher pressure situations, or in order to provide greater security against air loss. The cap may have a tether 65 to prevent the cap from being lost. The cap helps to form a hermetic seal since the handle of the diaphragm contacts the cap when the object is under pressure, thus also helping prevent deformation by the diaphragm. The cap may be a snap-on type, similar to the type commonly used with plastic milk containers. For a more durable seal, the cap may incorporate an O-ring (not shown) to provide a seal in conjunction with the diaphragm serving as a check valve. Various other cap attachment means, may be used such as a bayoneted fitting, etc.

Figure 6:
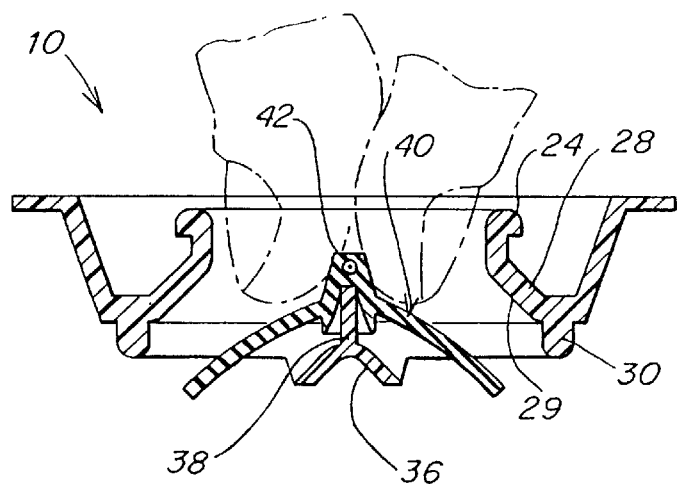
FIGS. 6–7 are a front cross-sectional view and side cross-sectional view, respectively, of the valve of FIG. 1 illustrating deflation.
Figure 7:
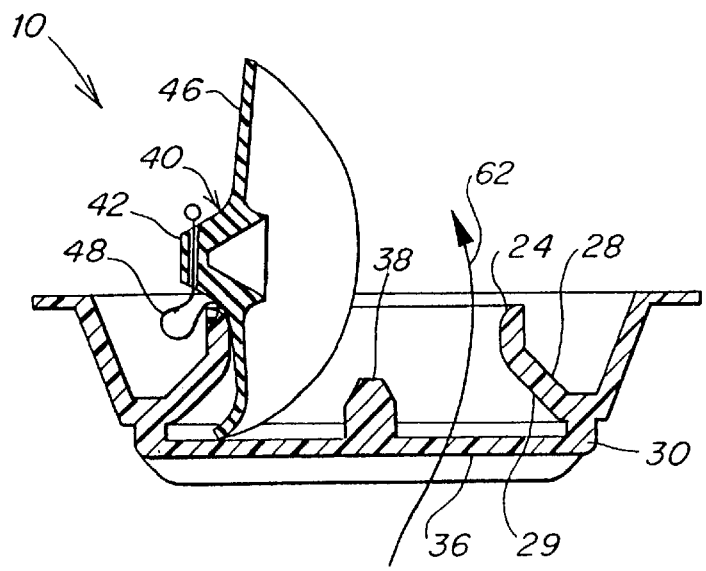
Figure 8:
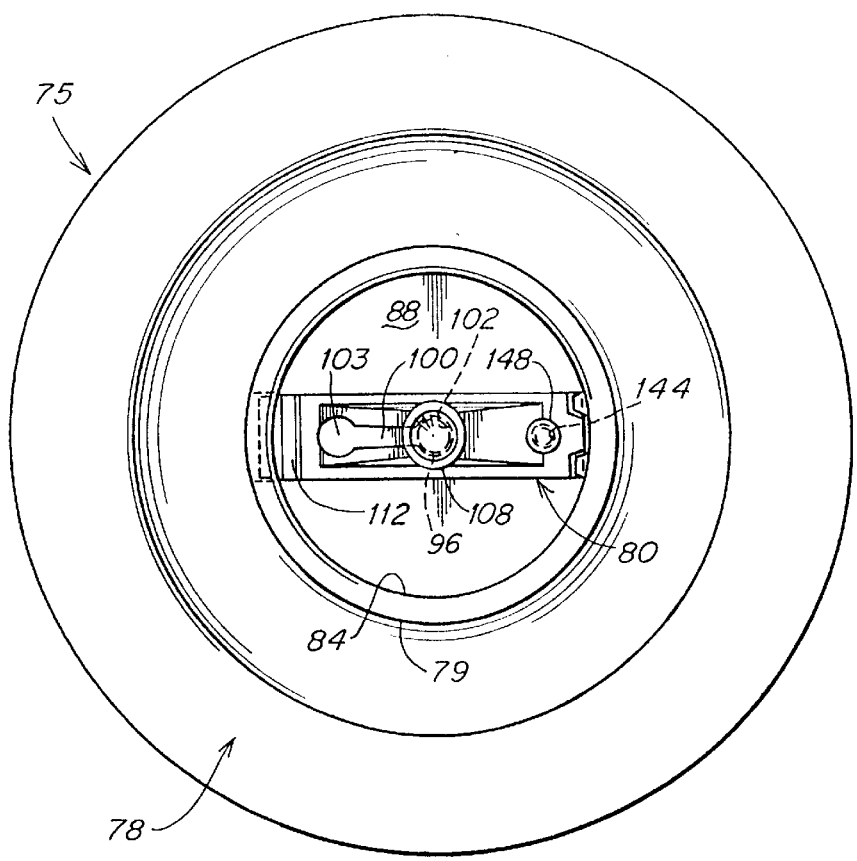
FIGS. 8 and 9 are a top view and a cross-sectional side view, respectively, illustrating a second embodiment of a self-sealing valve according to the invention.
Figure 9:
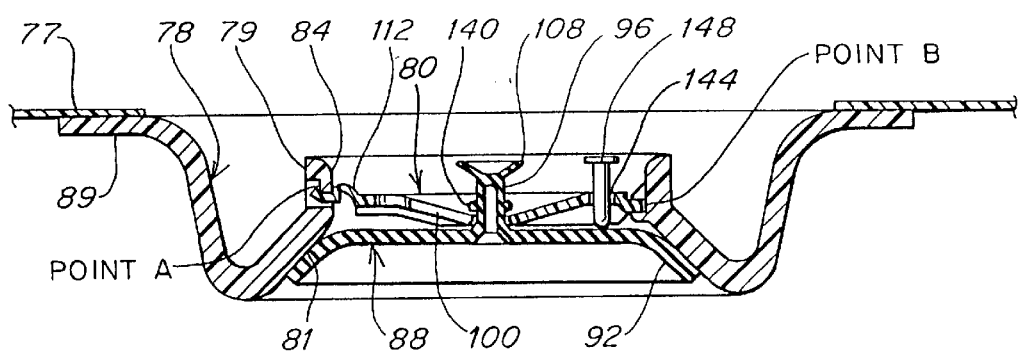
Figure 10:
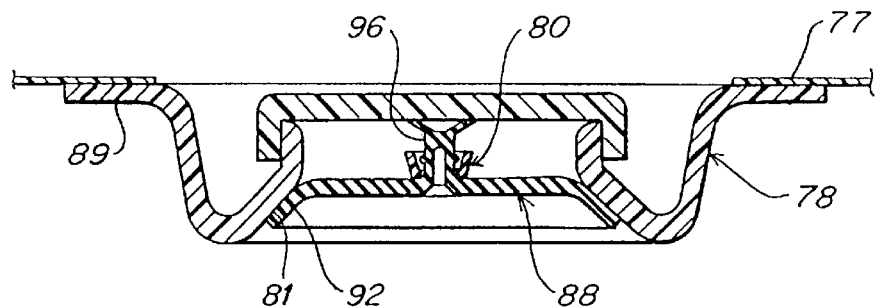
FIGS. 10 and 11 are a cross-sectional front view and top view of the second embodiment, including a protective cover.
Figure 11:
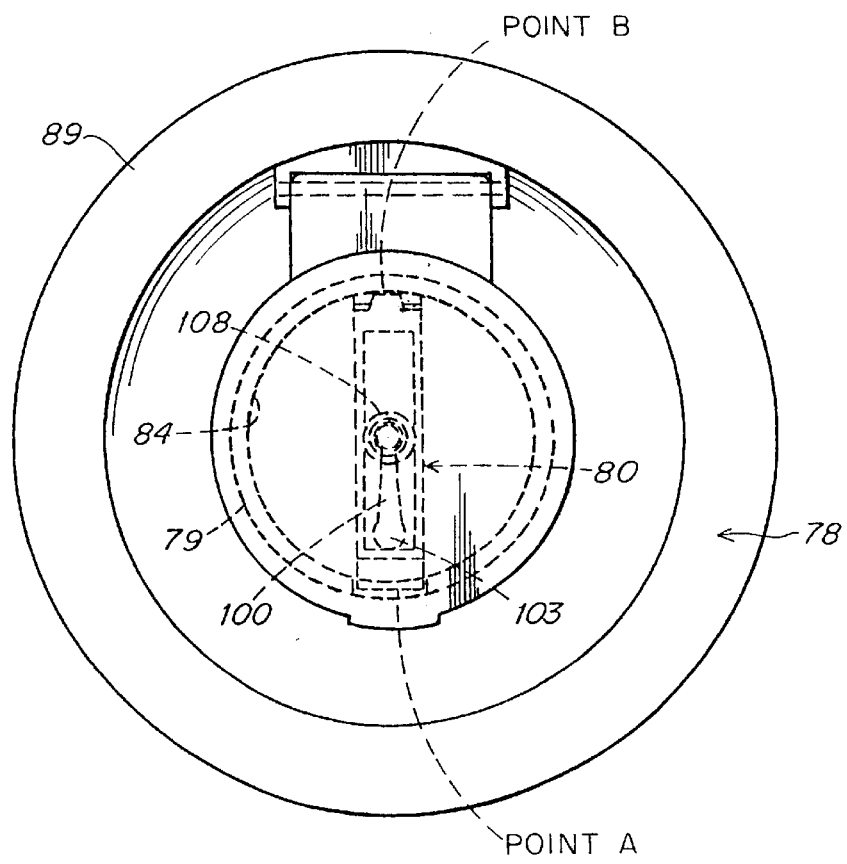
Figure 12:
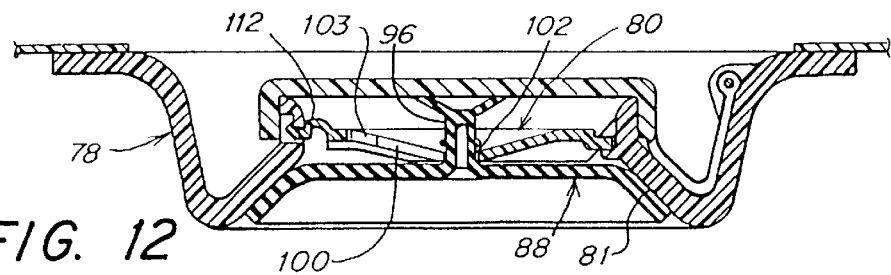
FIGS. 12–16 are cross-sectional side views that show the second embodiment in respective states of operation including seated, unseated, at rest, and during inflation.

FIGS. 6 and 7 illustrate views of valve 10 during deflation. To deflate, a user grasps handle 42 with two fingers and squeezes the flexible diaphragm to allow air to escape as indicated by arrow 62. This action lifts the diaphragm off the support post. To reduce the pressure, the user can push directly on the diaphragm to allow some air to escape. The user could entirely deflate this way, but it would be more time-consuming than removing the diaphragm. If a cap is used, it would first be removed.

According to the present invention, the valve automatically opens to accommodate pressurization and automatically closes to retain pressurization. In order to depressurize and deflate, a user can very easily grasp the diaphragm and can remove it outwardly through the inlet. At low pressurization, it is not necessary to have an additional cap, but at higher pressurization, a cap might be useful and may be necessary.

FIGS. 8–16 illustrate another embodiment of a self-sealing valve 75 of the invention intended for use with any low to medium pressure inflatable device. As in the previously described embodiment, the valve is self-sealing, allows both rapid inflation and deflation, and provides simple, ready means of adjusting and controlling pressurization of an inflatable device.

Similar to the valve in FIG. 1, the valve employs a valve housing 78 with a wide orifice, circular air inlet passage defined by a rim 79 which is centrally located within the housing. The rim's inner wall 84 opens to the underside of the valve housing which widens to provide a valve seat 81 for valve diaphragm 88. The valve housing's outermost edge 89 has a flanged periphery to accommodate attachment to a bladder or membrane 77 of an inflatable device.

The valve diaphragm 88 is deformable and has a centrally located, upwardly extending handle 96 with a projecting rim 108. Contained within the opening of the air inlet is a diaphragm hanger 80, secured to the wall 84 of the inlet at one end (Point A) and latched to the opposing wall at the other end (Point B). The hanger spans the width of the inner wall 84 and secures the floating diaphragm 88 within the valve housing. The hanger does not restrict movement at the periphery of the diaphragm, so that the outer periphery 92 can flex downward during inflation, removal, and re-insertion.

The diaphragm handle 96 is captured within slot 100 in the hanger. The slot allows a continuum of positions. There are two positions for the diaphragm, one at each end of the slot, where its handle 96 sits in openings of increased diameter (102 & 103). At opening 102, centered in the valve housing, the diaphragm is captured loosely. In situations requiring inflating of substantial volume and pressure, the diaphragm automatically moves downward to maximize airflow (see FIG. 16) and upward to a sealed position following inflation (see FIG. 12).

While the hanger allows the diaphragm to move vertically within the inlet for proper inflation and sealing, it also prevents excessive vertical lifting of the diaphragm during periods of increased pressure within the inflatable device.

Figure 13:
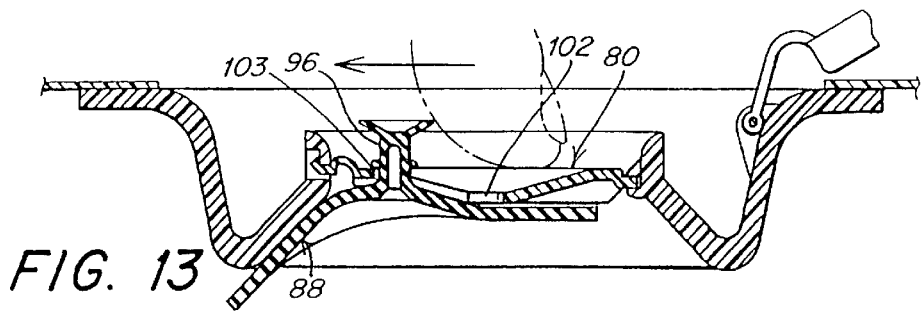
Figure 14:
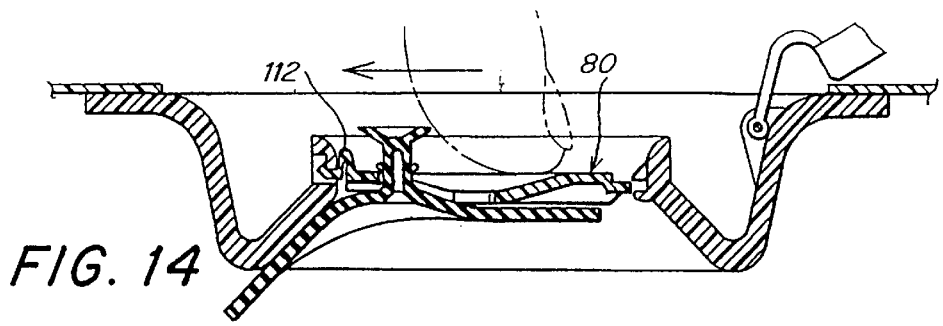
Figure 15:
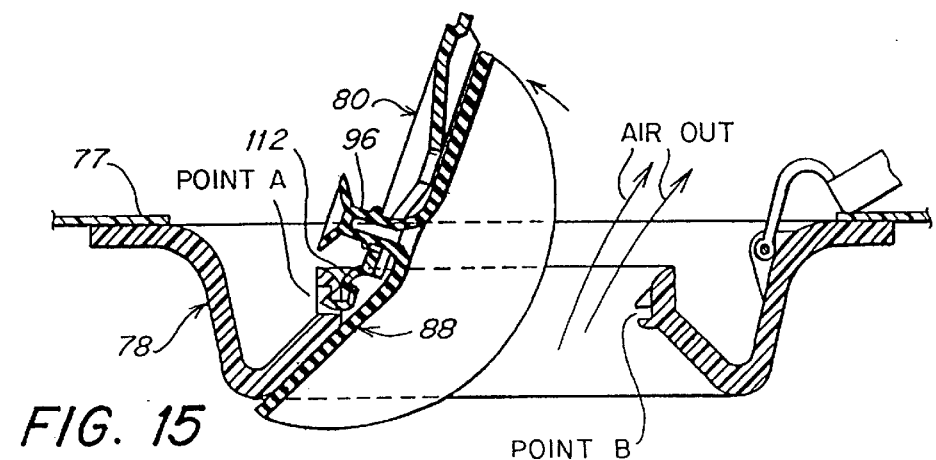

Fingertip action on the diaphragm's handle 96 will urge the diaphragm to slide sideways within slot 100 to the off-center opening 103 (see FIG. 13). This opening is located near the end of the hanger, where the hanger is rigidly attached to the inner wall of the air inlet (Point A). Adjacent to this point of attachment, the hanger incorporates a spring-mounted hinge 112 which, in response to further pressure in the same sideways direction as is required to move the diaphragm from the center position to the off-center position, causes the hanger to be unlatched. As the hanger is unlatched, the diaphragm is unseated, thereby allowing deflation of the inflatable device (see FIGS. 14 & 15).

When the diaphragm rotates out of the air inlet, it contacts the walls of the inlet and flexes inward assuming a "U" profile. When rotated back into the housing, the diaphragm returns to its original shape.

The handle 96 on the diaphragm has a projecting annular surface 140 that restricts the free vertical movement of the floating diaphragm. It prevents the diaphragm from dropping away from the valve seat under its own weight and serves as a lock (or check valve) to maintain the diaphragm in the sealed position even in the absence of air pressure within the device. This feature is of particular importance during manual inflating where the injecting of air may be intermittent. The locked position (see FIG. 12) prevents air loss that can occur between breaths or between strokes of a pump. In the locked position, the diaphragm cannot drop suddenly if pressure within the inflatable device falls to a level where it cannot support the weight of the floating diaphragm, thereby preventing sudden, rapid air loss.

Figure 16:
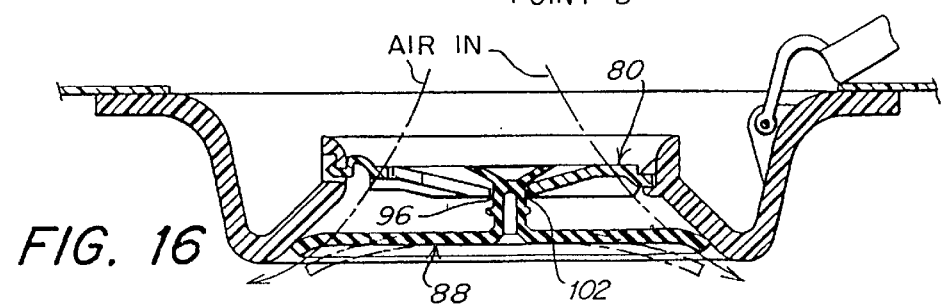
Figure 17:
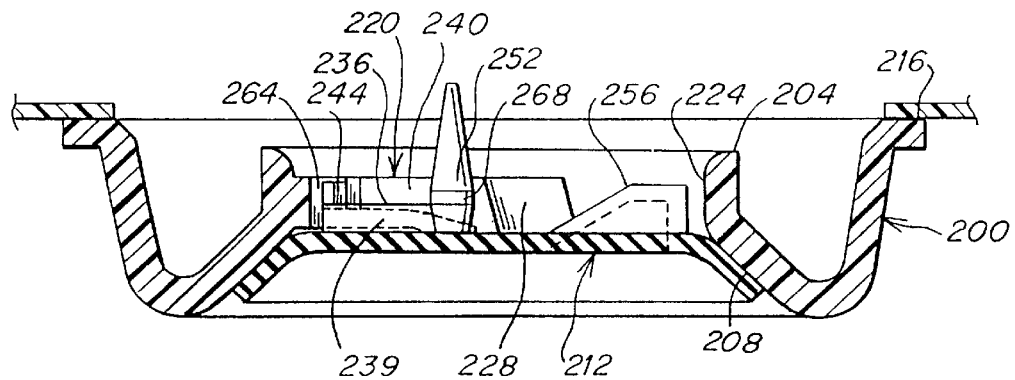
FIGS. 17–19 are cross-sectional views of a third embodiment of a self-sealing valve according to the invention.
Figure 18:
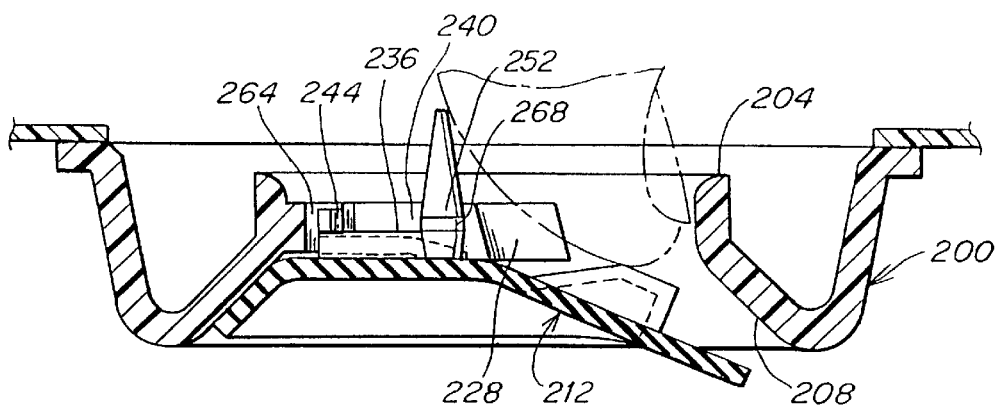
Figure 19:
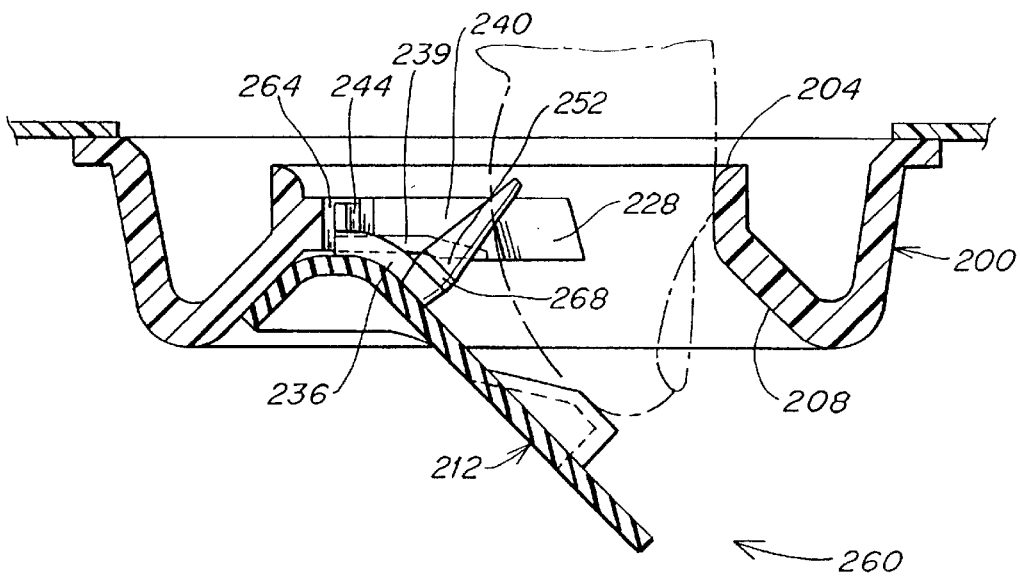
Figure 20:
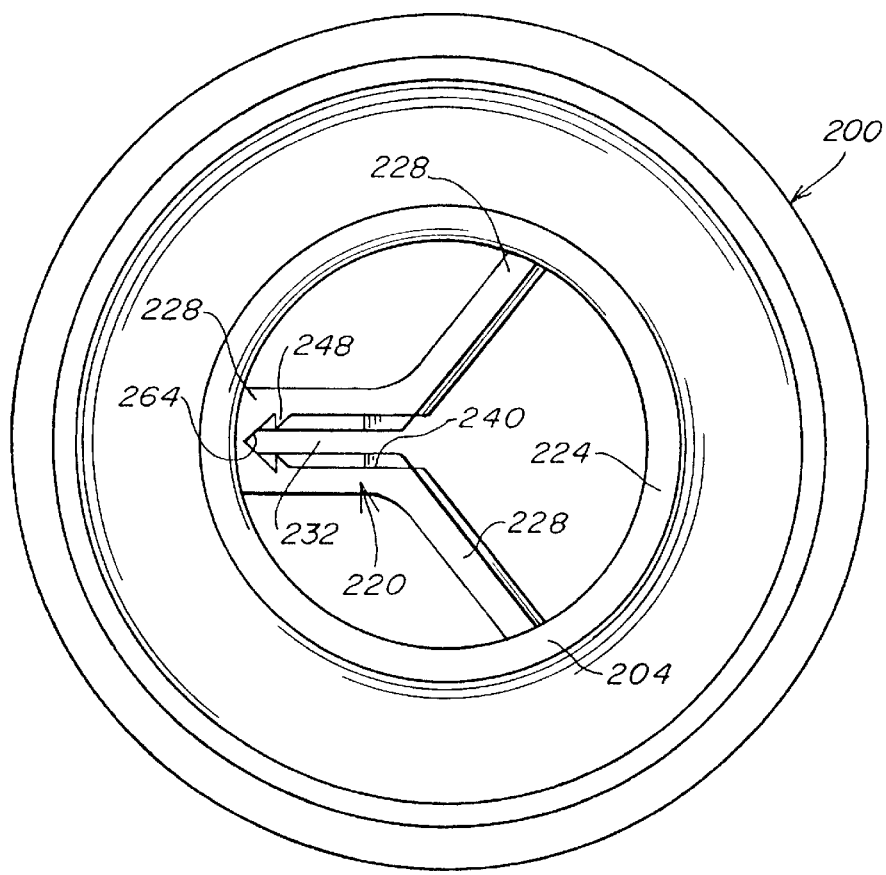
FIGS. 20 and 21 are a top view and a cross-sectional side view, respectively, of the third embodiment, wherein a diaphragm is not installed.
Figure 21:
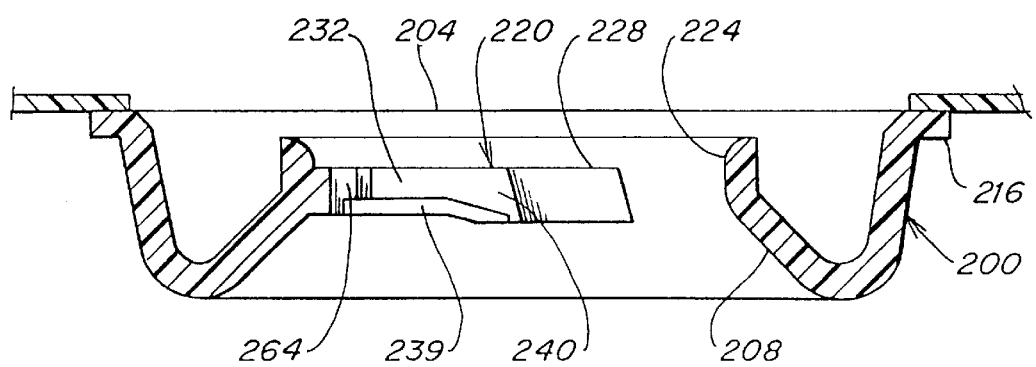
Figure 22:
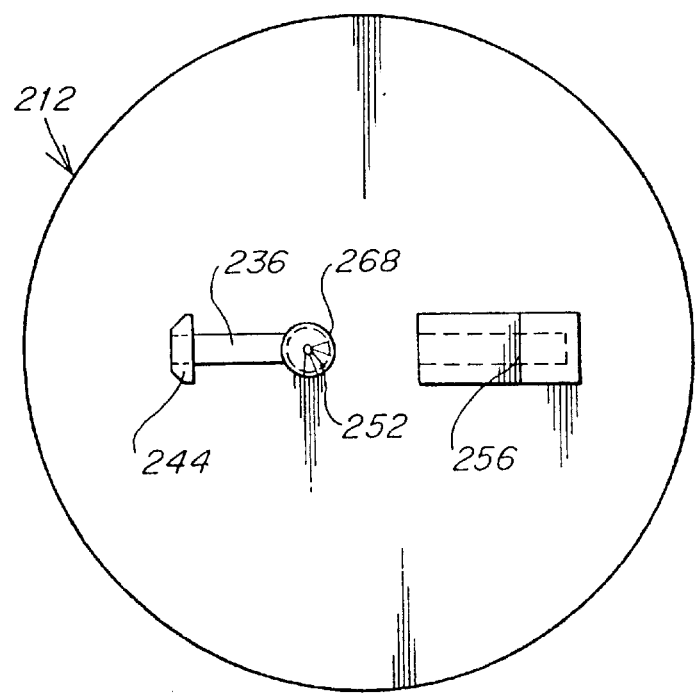
FIGS. 22 and 23 are a top and a side view, respectively, of the diaphragm used with the valve of FIG. 17.
Figure 23:
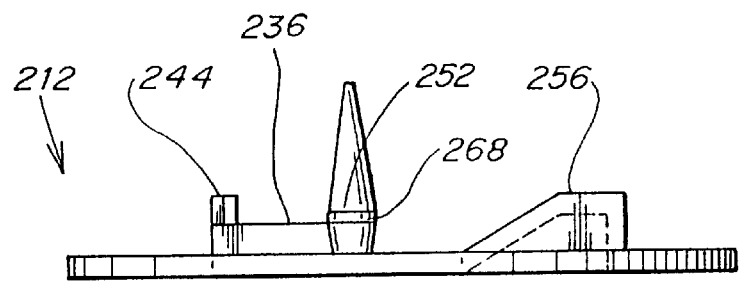
Figure 24:
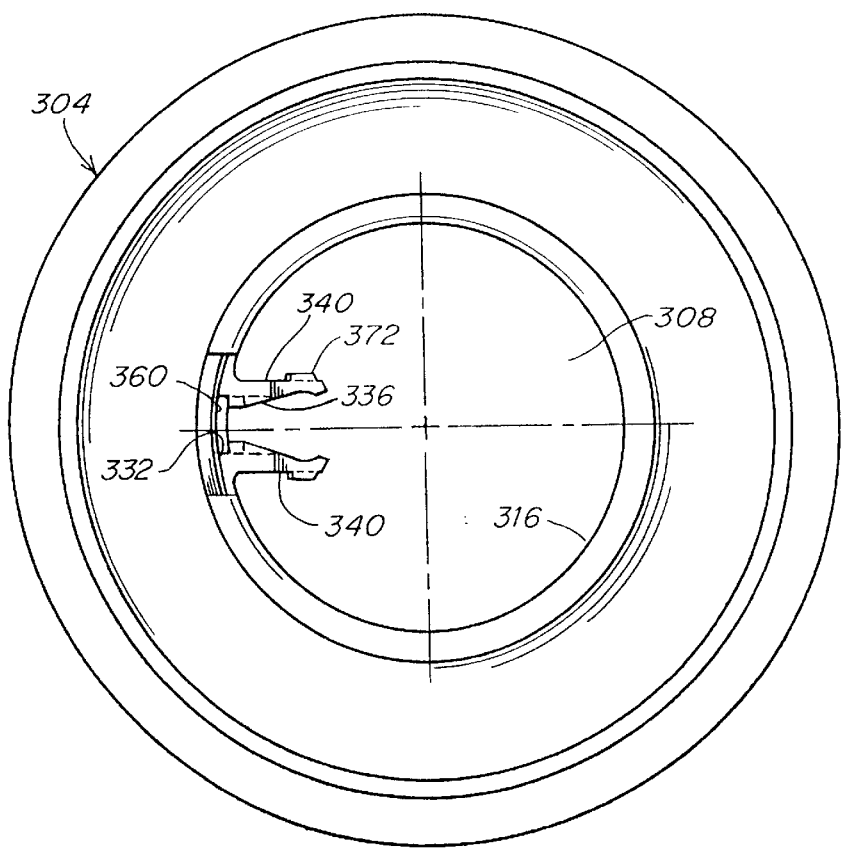
FIGS. 24 and 25 are a top view and a cross-sectional side view, respectively, of the valve housing of a fourth embodiment of a self-sealing valve according to the invention.
Figure 25:
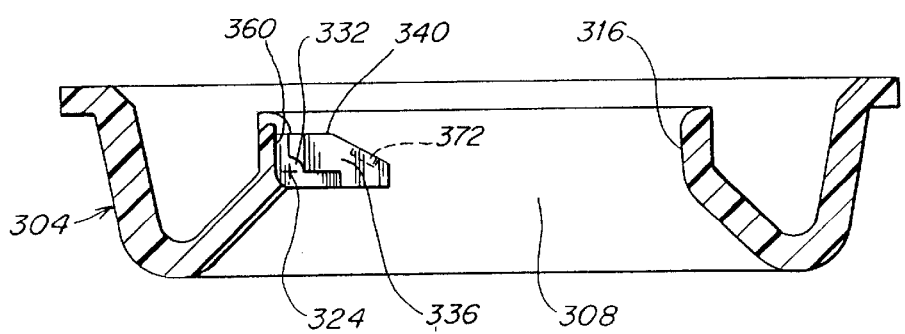
Figure 26:
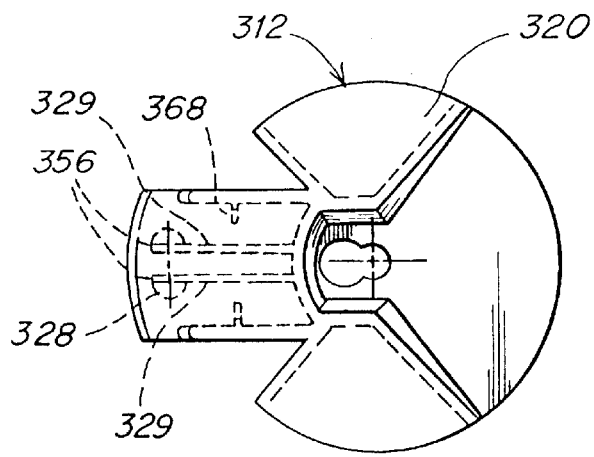
FIGS. 26–28 are a top, end, and side cross-sectional view, respectively, of a diaphragm hanger arm of the fourth embodiment.
Figure 27:
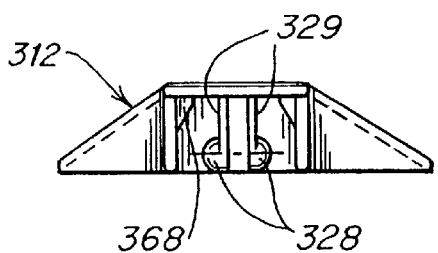
Figure 28:
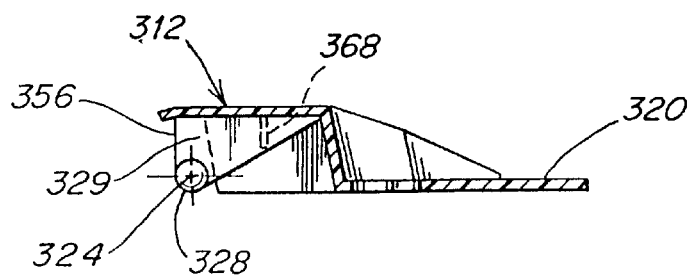
Figure 29:
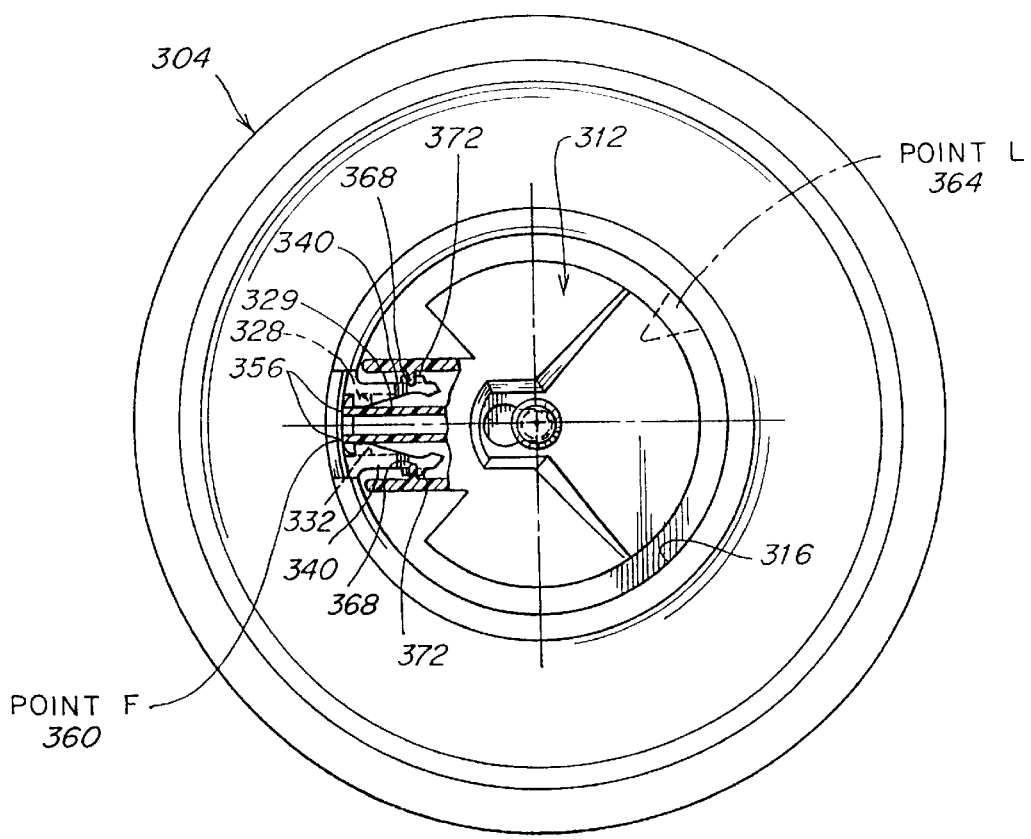
FIGS. 29–32 are a pair of top and cross sectional side views, showing the valve of FIG. 24 in two states of operation, seated and unseated.
Figure 30:
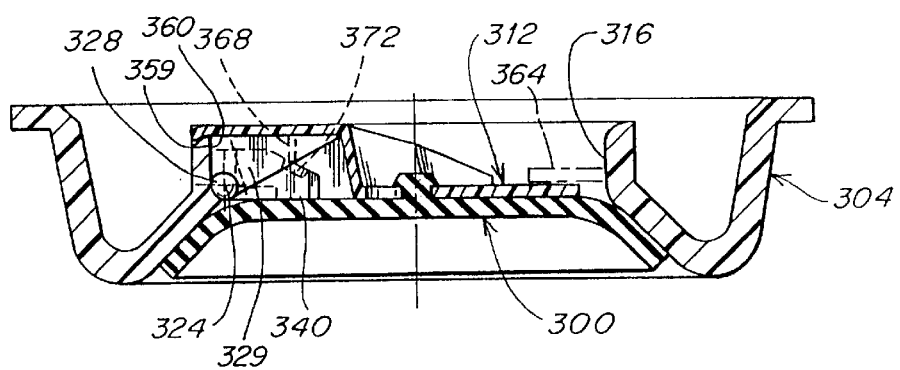
Figure 31:
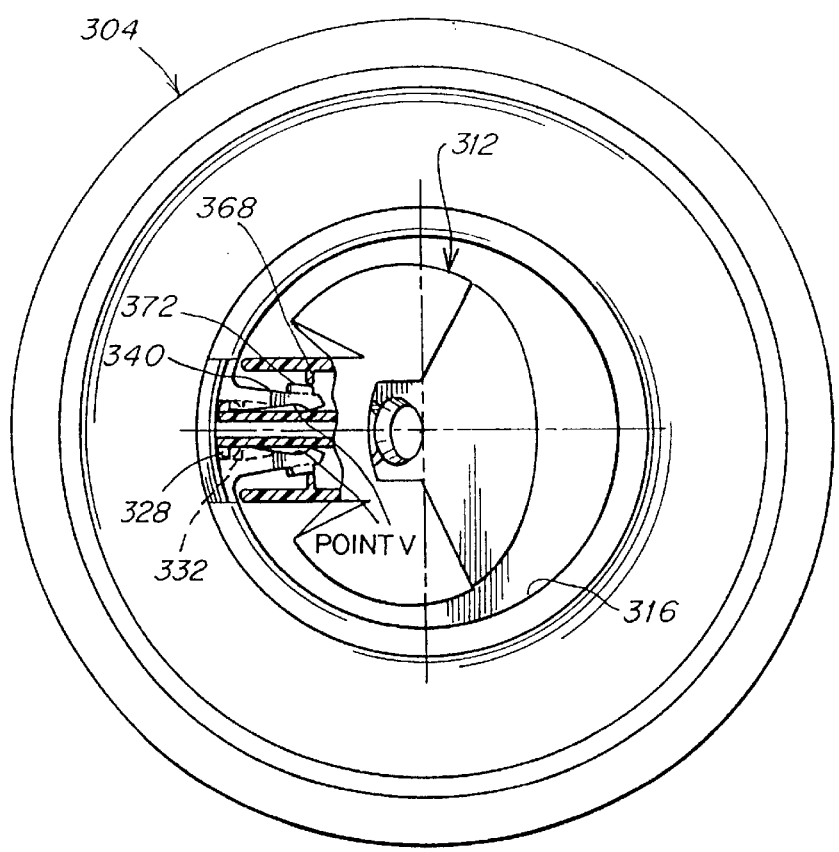
Figure 32:
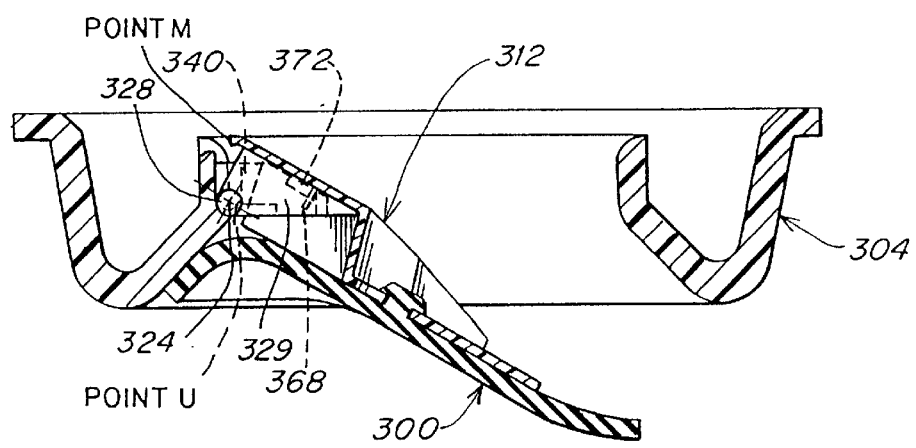
Figure 33:
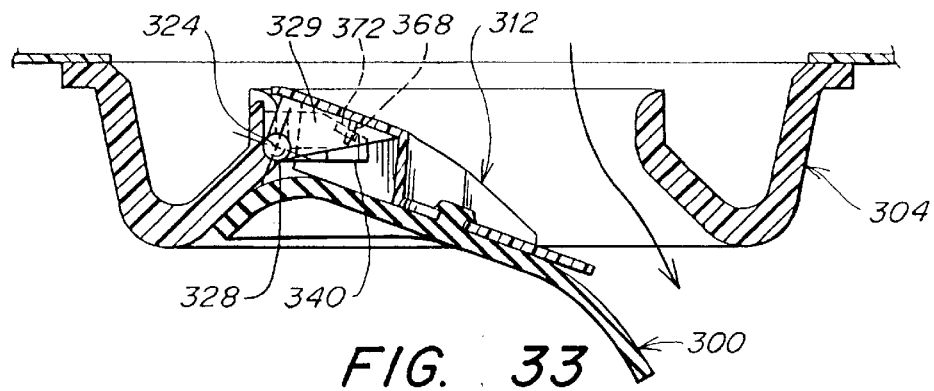
FIGS. 33–36 are cross-sectional side views showing the valve of FIG. 24 in four states of operation including inflation, seated, pressure control, and deflation, respectively.
Figure 34:
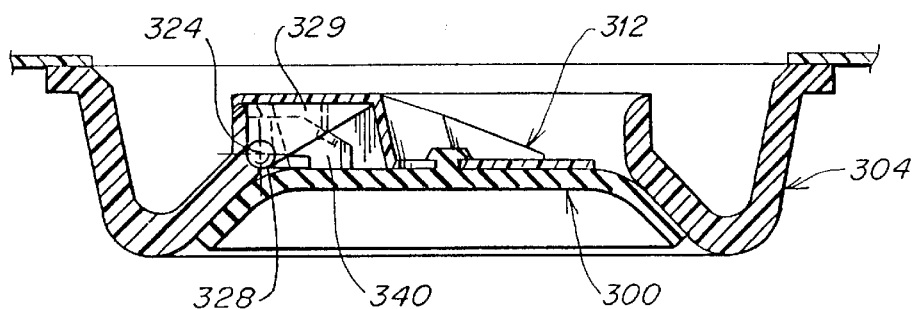
Figure 35:
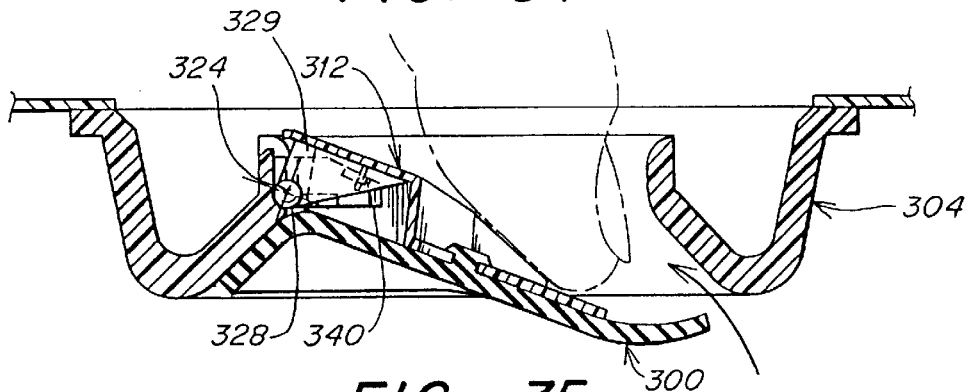
Figure 36:
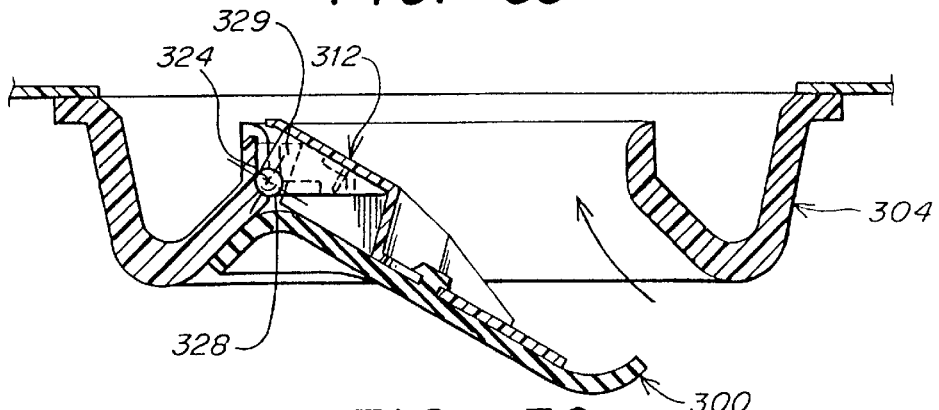
Figure 37:
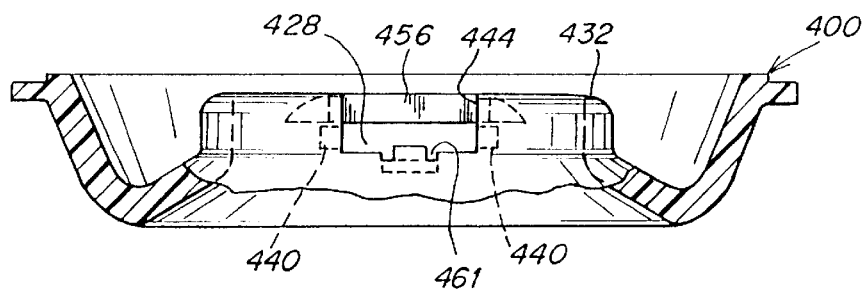
FIGS. 37–39 are an end, a top, and a cross-sectional side view of a valve housing of a fifth embodiment of a self-sealing valve according to the invention.
Figure 38:
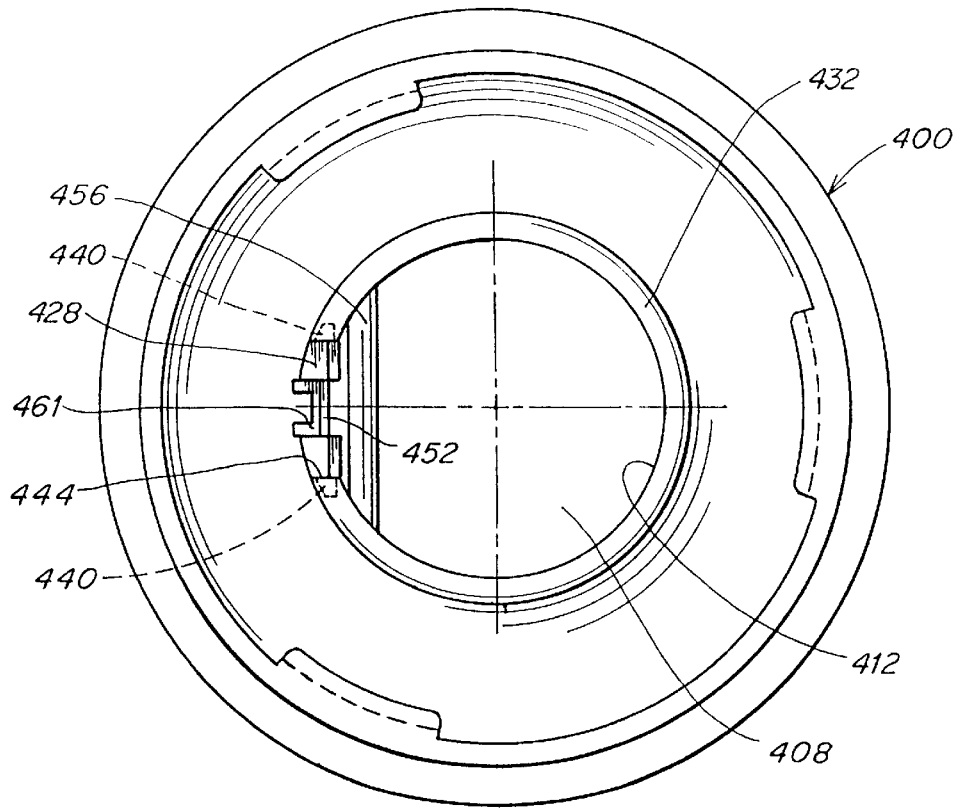
Figure 39:
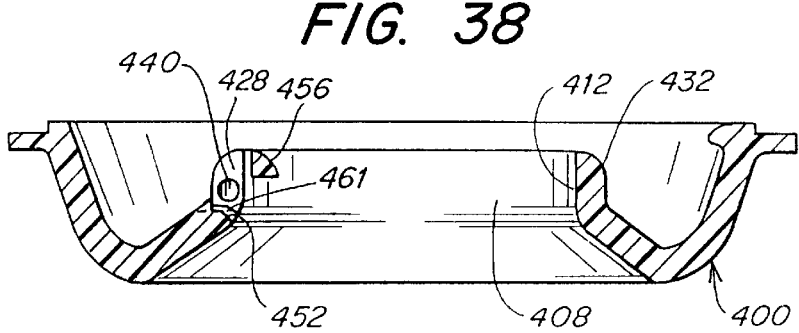
Figure 40:
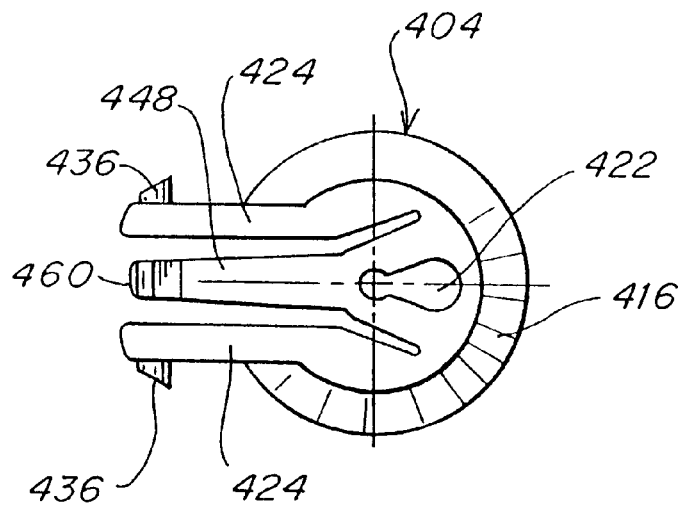
FIGS. 40 and 41 are a top and a side view of a diaphragm hanger arm of the valve of FIG. 37.
Figure 41:
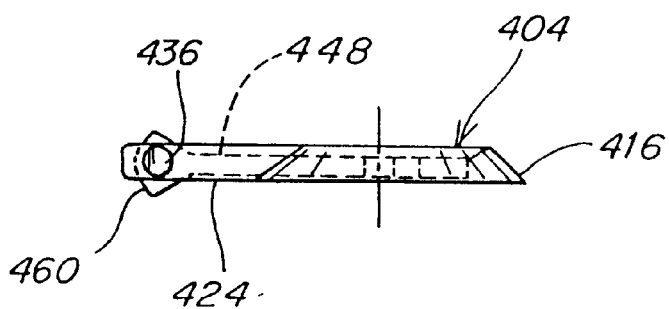
Figure 42:
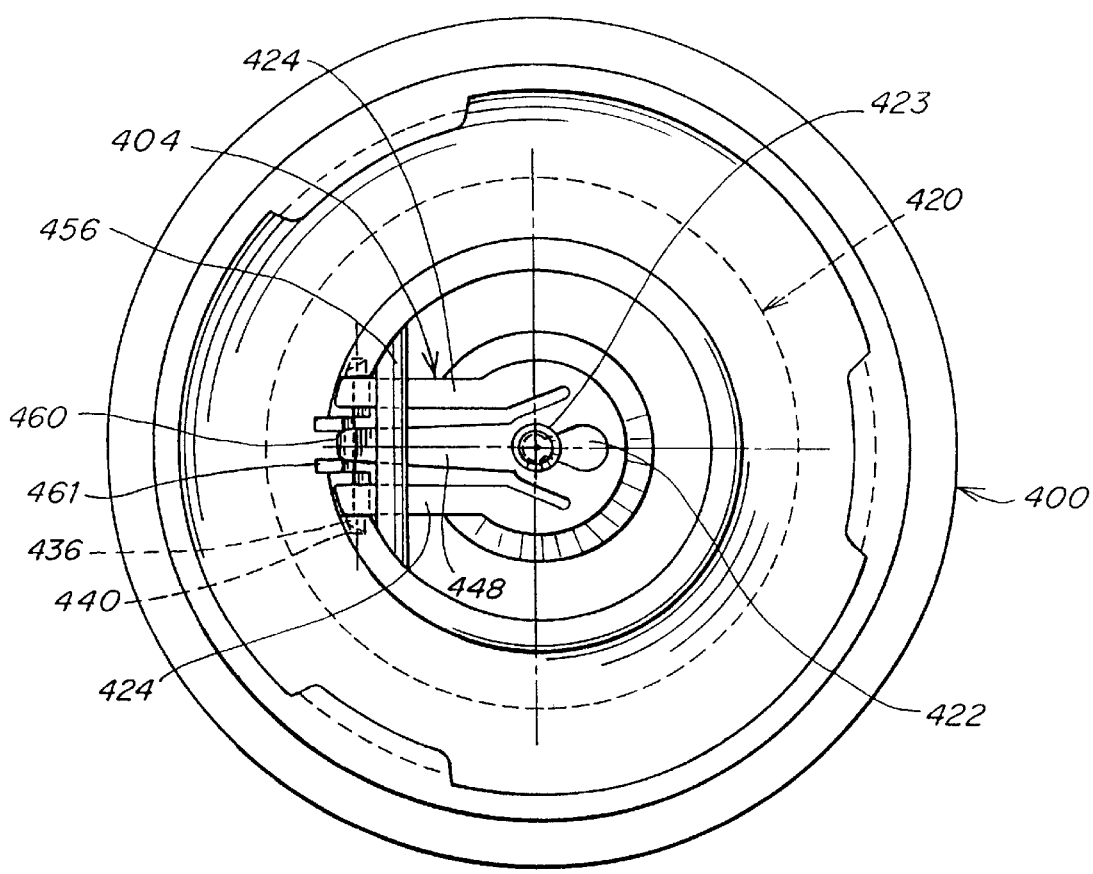
FIGS. 42 and 43 are a top and a cross-sectional side view of the valve of FIG. 37, showing a housing, the hanger arm, and a diaphragm.
Figure 43:
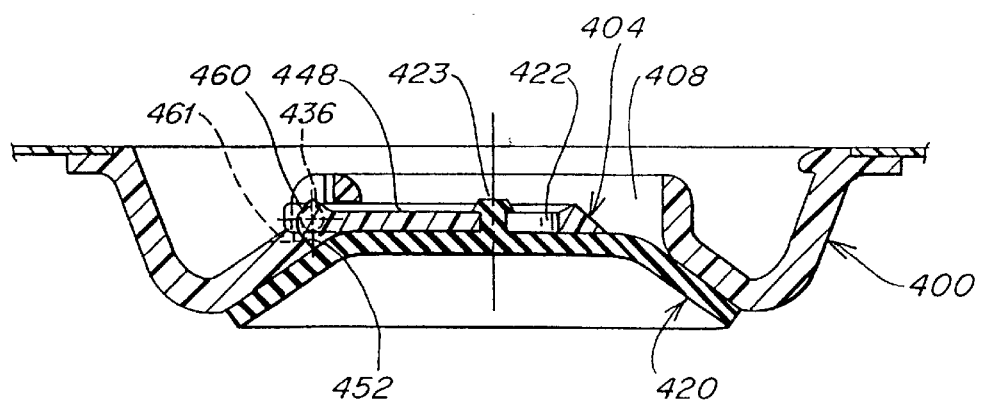
Figure 44:
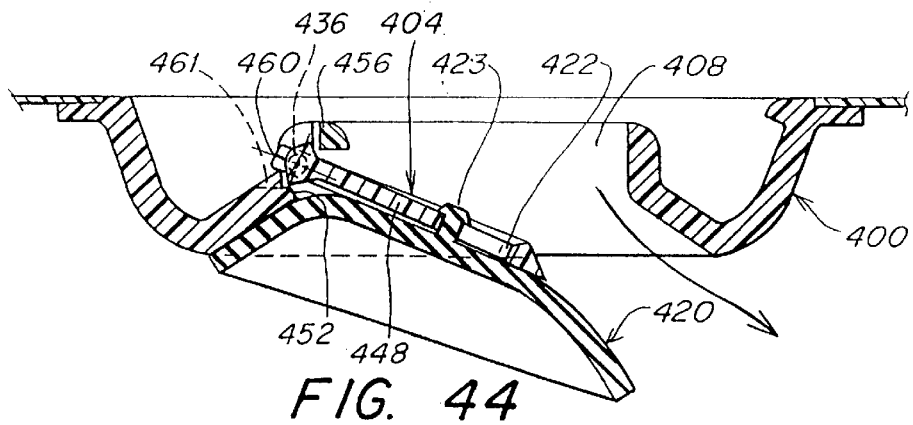
FIGS. 44–47 are cross-sectional side views showing the valve of FIG. 37 in four states of operation including inflation, seated, pressure control, and deflation, respectively.
Figure 45:
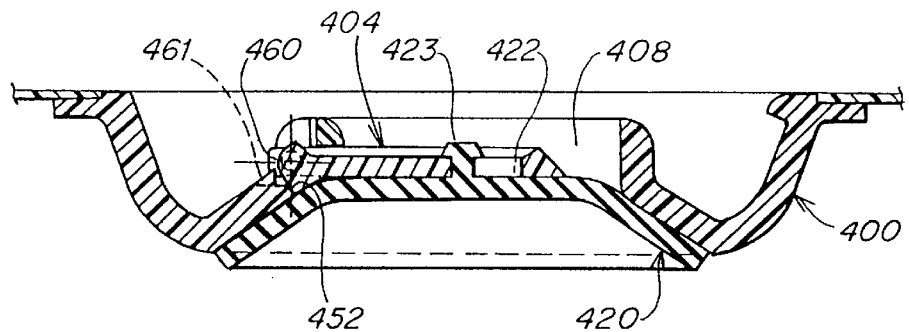
Figure 46:
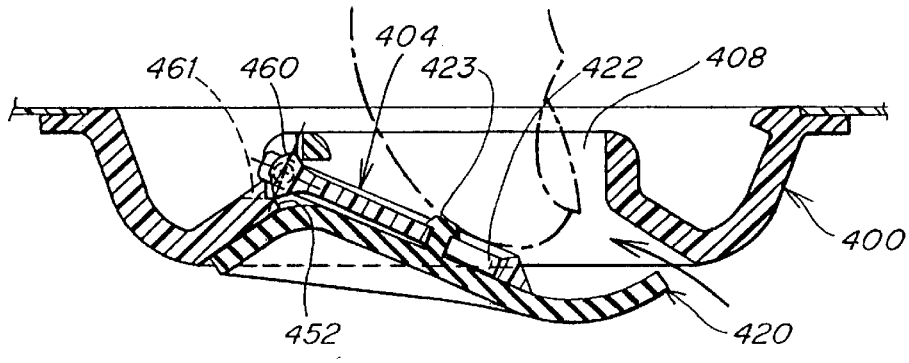

Under certain conditions, setting the diaphragm in the unlocked (unsealed) position (as shown in FIG. 16) prior to inflation can improve inflation efficiency. With the use of a low pressure, high volume, steady-state inflation source, the unlocked position can increase airflow.

Since the area immediately below the diaphragm is unobstructed the bottom of the diaphragm is accessible through the flexible membrane of the inflatable device, providing means for moving the diaphragm from the unlocked to the locked position.

The latching end of the hanger may have an opening 144 to support a cylindrical plunger 148. Upon pressurization of the inflatable device, the plunger slides vertically within the hole and is forced upward as the diaphragm rises to the sealed position. The plunger can be manually forced down (i.e. via fingertip) to temporarily interrupt the seal. Thus, a user can effect small air releases for the purpose of adjusting pressure within the device. Alternatively, any other area within the air inlet that allows access (such as, for example, fingertip access) to the diaphragm may be used for such a purpose, wherein the diaphragm is temporarily unseated by direct contact of a fingertip.

FIGS. 17–23 illustrate another embodiment of a self-sealing valve of the invention, which is intended for use in any low to medium pressure inflatable device. Similar to the previously described embodiments, the valve is self-sealing, allows both rapid inflation and deflation, and provides a simple ready means of adjusting and controlling pressurization of an inflatable device.

The valve employs a valve housing 200 with a wide orifice, circular air inlet passage defined by a wall 204 which is centrally located in the housing. The wall 204 opens to the underside of the valve housing which widens to provide a valve seat 208 for a valve diaphragm 212. The outer rim 216 of the valve housing accommodates attachment to the film or membrane which comprises the inflatable device.

The valve combines the wide-orifice inlet with a fixed diaphragm hanger 220. The diaphragm hanger consists of a configuration of inwardly extending ribs 228 rigidly attached to the inner wall 224 of the air inlet, to which the valve diaphragm is removably attached, and from which the diaphragm is suspended and located within the valve housing.

The hanger rib configuration forms a generally extending Y-shaped hanger 220 with ribs that radiate inward from the air inlet inner wall the to center of the inlet passage. Proximate the upper access, the single ribs extend at an angle, in parallel juxtaposition, to create the third spoke. Juxtapositioning these ribs creates a space, or slot 232, between the ribs, into which a mating rib 236 projecting from the top surface of the diaphragm is inserted to secure the diaphragm into position. At the point where the hanger ribs are juxtaposed, the ribs assume an opposing "L" shape profile, leaving the bottom of the slot 239 narrower than the top of the slot. The widened section of the slot 240 accepts an enlarged area 244 projecting at the top of the mating diaphragm rib, creating a "hanger" from which the diaphragm is suspended, thereby securing a vertical alignment of the valve diaphragm and the valve housing.

Horizontal alignment is achieved by interlocking the valve diaphragm 212 in the hanger slot 232. A constriction 248 near the end of the slot, formed by projections in the slot, captures the enlarged area 244 of the mating diaphragm rib and prevents horizontal movement of the diaphragm during operation.

Near the center of the valve diaphragm 212, an additional enlargement 252 to the surface of the diaphragm rib provides limited interference with the hanger slot 232, holding the diaphragm in a closed (substantially sealed) position and preventing the valve diaphragm from drooping or flexing downward under its own weight, away from the valve seat. For purposes of inflation and deflation, this interference is easily overridden. External air pressure during inflation will force the diaphragm out of the closed position. Fingertip pressure on the target area 256, initiates deflation and will also override the interference.

The enlargement 252 near the center of the diaphragm rib has an additional function. The limited interference works in both directions. In addition to holding the valve diaphragm 212 in a closed position, it also holds the diaphragm in an open position 260, away from the valve seat during deflation. During deflation the enlargement interferes with the bottom of the hanger so as to prevent upward movement of the diaphragm, maintaining the valve in the open position.

Fingertip pressure on the target area 256 can be employed to temporarily interrupt the seal and allow controlled release of the air, providing a simple means of adjusting pressurization of the inflatable device. The valve self-seals upon removing the fingertip pressure.

For installation and replacement of the valve diaphragm 212, the diaphragm is inserted into or removed from the diaphragm hanger 220 through the exterior of the air inlet orifice.

The ribs are configured to securely position the diaphragm within the valve housing and to provide maximum air flow through the air inlet orifice. The ribs are also configured to allow the diaphragm to be manually deflected for temporary interruption of the air seal.

For more substantial air release, such as during deflation, the ribs and diaphragm are additionally configured so that with further manual depression of the diaphragm the diaphragm will be moved to a point where it will be held in a partially open position, facilitating air release.

The diaphragm is secured with the operating position at a point 264. The point works in combination with an interlocking lip in the diaphragm 268 to secure a closed position regardless of the internal pressure of the inflatable device. For rapid inflation, with maximum airflow, if the lip on the diaphragm is in the locked position, it can be manually unlocked by pressing the diaphragm into the orifice at the point 256. Upon pressurization, the diaphragm automatically moves to the locked position. During temporary interruption of the seal, the diaphragm will normally stay in the locked position. For maximum air release during deflation, further deflection of the diaphragm will move it into an unlocked position 260.

In an alternative configuration of the valve housing, the outer rim of the air inlet is a removable component and may be separated from the valve housing. The removable rim itself will accommodate various internal configurations according to the pressurization/performance requirements of the device the valve is used with.

FIGS. 24–36 illustrate another embodiment of the self-sealing valve of the invention. The diaphragm (300) is positioned within the valve housing (304) by a movable horizontal arm (312) which suspends the diaphragm in the center of the air inlet (308). This arm, a rotating diaphragm hanger (312), is removably contained within the air inlet of the valve housing, with one end secured laterally, adjacent to the inside wall (316) of the air inlet. The point of attachment is configured to allow the hanger to pivot downward into the valve housing, a motion which unseats the valve diaphragm and opens the airpath into the bladder as required for both inflation and deflation of an inflatable device.

The hanger flares outward towards the inner wall of the air inlet creating a "paddle" surface (320) which overspreads much of the air inlet. The expanded horizontal surface of the paddle provides stability to the surface of the flexible diaphragm (300) as it rotates back and forth from the seated to an unseated position. The paddle also enhances manipulation of the hanger (by fingertip) for pressure control. The paddle as shown in the drawings has a continuous surface at its perimeter. Alternative paddle configurations are being considered which employ a more open paddle structure, such as for example, radiating ribs, etc are intended to be within the scope of this disclosure.

The pivot point (324) includes a hinge "pin" (328) suspended via a pair of ribs (329) from the underside of the pivoting hanger (312) and a surface with a mating recess (332) formed on the inside walls (336) of a pair of fixed arms (340) which extend horizontally inward from the inside wall (316) of the air inlet.

The pivot point works in combination with surface projections extending from both the valve housing and the hanger arm to:

A) restrict movement of the valve diaphragm to prevent outward movement of the valve diaphragm into the air inlet (as may occur under pressurization), or to prevent rotation of the diaphragm through the valve housing into the inflatable device.

B) secure the diaphragm alternatively in an open and a closed position.

C) suspend the hanger and diaphragm in a substantially closed position while allowing both to flutter from a partially open to a sealed condition in response to external or internal pressure.

To accomplish (A), the vertical rear edge (356) of the pair of ribs (329) suspending the hinge pin (328) bear on the inside wall of the air inlet at Point F (360), preventing the hanger from rotating upward beyond a horizontal position. Downward rotation of the hanger is restricted by the pair of fixed arms (340), as they bear on the underside of the top of the hanger (see FIG. 32).

In certain applications, additional support may be necessary in order to accomplish (A). Point L (364) may be added at various locations around the inside perimeter of the air inlet. It includes an overhanging projection extending inward from the inner wall of the air inlet which bears on the perimeter of the paddle surface of the rotating hanger.

To accomplish (B), a second pair of projections (368), extending from the inner side walls of the rotating hanger removably engage with the tabs (372) integral to the fixed arms (340). Once in a downward (open) orientation, interference created by the tab and mating projection prevents the hanger from freely rotating back to the horizontal position, thus maintaining the valve in an open position in order to facilitate deflation. This interference may easily be overridden, either manually (by pressing through the bladder's flexible membrane upward on the bottom of the diaphragm) or by pressurization (internal air pressure resulting from full inflation or compression of the bladder).

The projections and opposing surface work in combination with a spring action integral to the fixed arms (340). The spring action, a lateral flexure resulting from the slim vertical profile of the arms, allows the arms to flex inward. In doing so, the combined width of the arms compress, overriding the interference created by the projection and opposing surface. The ability of the fixed arms to flex laterally in this manner enables the hanger (and the diaphragm) to be removably secured in both an open and a closed position.

The drawings (see FIGS. 31 and 32) illustrate the above described flexure. Alternative sources of flexure, in keeping with the general valve configuration disclosed here, have been considered: flexure within the rotating hanger could either supplement or replace the spring action of the fixed arms.

To accomplish (C), the projections 368 located on the inner side walls of the hanger have an inclined surface. When pressure is applied and the hanger rotates downward, the incline forces the pair of fixed arms to compress (employing the arms' spring action). With removal of pressure, the spring arm returns to its natural position. As it returns, it bears on the incline and lifts the hanger (and diaphragm) back to a horizontal (sealed) position. The ability of the valve to freely flex in this manner facilitates the following:

1) increases the efficiency of manual inflation. As manual inflation involves a pulsed injection of air, it is important the valve automatically seal between pulses (preventing air loss); and 2) allows adjustment (control) of pressurization. To enable controlled releases of air while the device is in use, it is important that the hanger be both accessible and that it move freely to facilitate partial opening of the diaphragm (finger tip actuation) and automatic sealing of the diaphragm thereafter.

The pair of ribs (329), containing the segmented hinge "pin", extend downward from the underside of the top surface of the hanger. Sideways flexure of these ribs provides means for attachment or removal of the hanger from the valve housing. When the hanger is in operating position (hinged and open), sideways movement of the top surface of the hanger at Point M results in an inward flexing of the ribs, allowing the hinge "pin" to move away from the mating surface on the fixed arms, and thus dislodging it from the hinge point. The inward flexing occurs as the hinge "pin", with its curved outer edge, slides over the pin's mating surface at Point U. A radius softened edge at Points V combines with the pin's curved outer edge to reduce interference and allow removal and insertion of the hanger.

Reversing this sideways motion causes the "pin" to engage. The ribs containing the hinge "pin" again flex inward, allowing the pin to move into the hinged position.

Removal and insertion of the hanger (and the valve diaphragm) would not be part of the normal operation of the valve, occurring only upon the installation of a new hanger or diaphragm into the valve housing, or as a maintenance function.

1. FIGS. 37–47 illustrate still another embodiment of the self-sealing valve of the invention. In a simplified version of the valve of FIGS. 24–36, the diaphragm is also positioned within the valve housing (400) by a movable horizontal arm (404) which suspends a valve diaphragm in the center of the valve housing's air inlet. As in the valve of FIGS. 24–36, this arm, a rotating diaphragm hanger, is removably contained within the air inlet (408) of the valve housing, with one end secured laterally, to the inside wall (412) of the air inlet. As in the valve of FIGS. 24–36, the point of attachment is configured to allow the hanger to pivot downward into the valve housing, unseating the valve diaphragm and opening the airpath into the bladder as required for both inflation and deflation of an inflatable device.

As in the valve of FIGS. 24–36, the rotating diaphragm hanger includes a paddle surface (416) concentric with the air inlet and overspreading a substantial portion of the inlet.

Serving as the valve diaphragm (420), a circular disc made of a flexible, air impermeable material, is suspended from the center of the paddle surface. A hole configuration (422) allows the circular flange (423) projecting from the center of the top of the diaphragm to pass through the underside of the rotating arm and lock the diaphragm in suspension.

Two parallel ribs (424) extending from the paddle surface to a slotted section (428) in the rim (432) of the air inlet include hinge pins (436) which mate with a recessed area (440) located in either sidewall (444) of the slot, thus defining a pivot point.

Between the ribs, running parallel with them, a leaf spring member (448) extends form the center of the paddle surface to the wall of the air inlet. Bearing on an angled surface (452) recessed in the wall of the inlet, the spring is configured to hold and maintain the rotating arm (and the attached valve diaphragm) in a horizontal position while allowing both to rotate downward into the valve housing upon inflation or deflation.

Another rib (456), integral to the rim of the valve housing, running perpendicular to and just above the parallel ribs of the rotating arm, serves as a barrier and prevents the rotating arm from rotating upward beyond a horizontal position.

Figure 47:
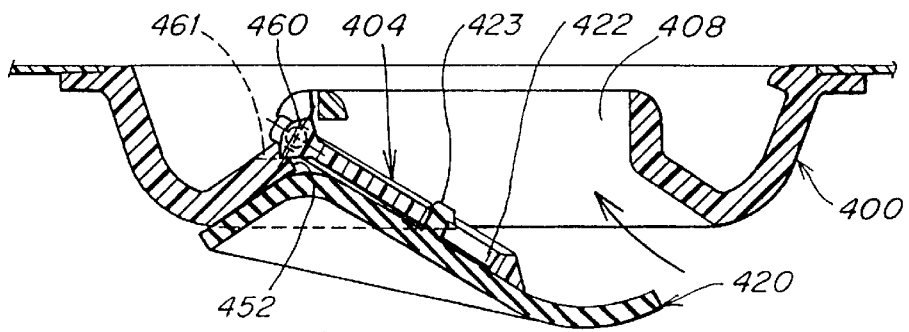
Figure 48:
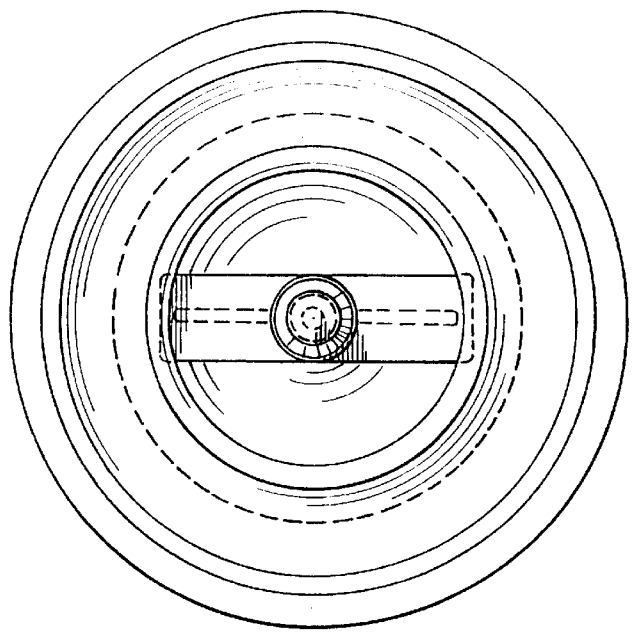
FIGS. 48 and 49 illustrates a sixth embodiment of a self-sealing valve according to the invention, with a top view and a cross-sectional side view, respectively, the side view showing the valve in a seated condition.

As the arm rotates, the end (460) of the leaf spring moves in a recessed area (461), which includes angle (452). This area and the end of the spring provide a combined configuration which:

1) allows the rotating arm to rotate inward with the application of pressure and return to the horizontal position when pressure is removed (see FIGS. 44 and 45), and 2) removably engages with the rib, such engagement causing the rotating arm to maintain the valve in an open condition in order to facilitate deflation (see FIGS. 46 and 47), and 3) restricts downward motion of the rotating arm into the valve housing (see FIG. 47).

So configured, it is envisioned that the valve will operate in essentially the same way as the valve of FIGS. 24–36.

Figure 49:
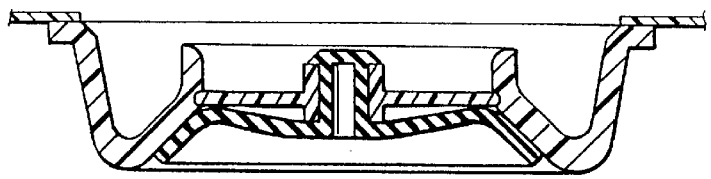

A further variation of the self-sealing valve of the invention is illustrated in FIGS. 48–51 and involves a flexible diaphragm supported in a fixed location within the valve housing, located so as to allow the outer diameter of the diaphragm to seat against the mating surface of the valve housing and provide a complete hermetic seal subsequent to inflation, the seal resulting solely from outward pressure due to pressurization within the inflated bladder, this pressure forcing the diaphragm to maintain a seated condition (See FIG. 49).

Figure 50:
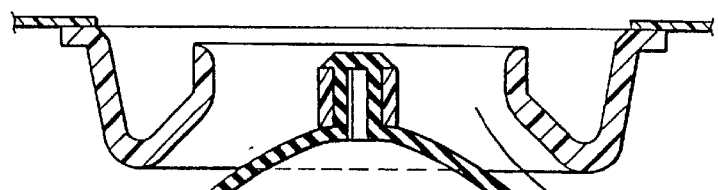
FIGS. 50 and 51 illustrate the valve of FIGS. 48 and 49 in two states of operation, inflation and deflation, respectively.

Likewise, inward pressure during inflation causes the flexible diaphragm to separate from the valve seat, providing a pathway for infusing the device with air (See FIG. 50).

Figure 51:
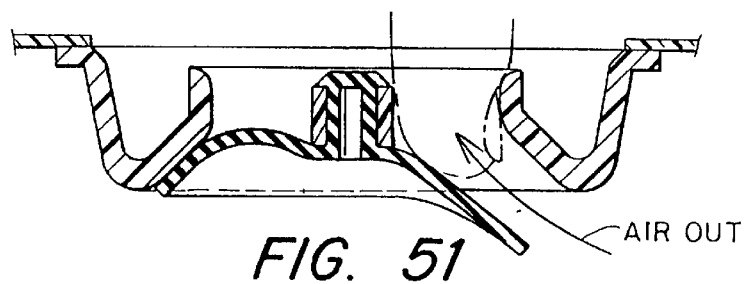
Figure 52:
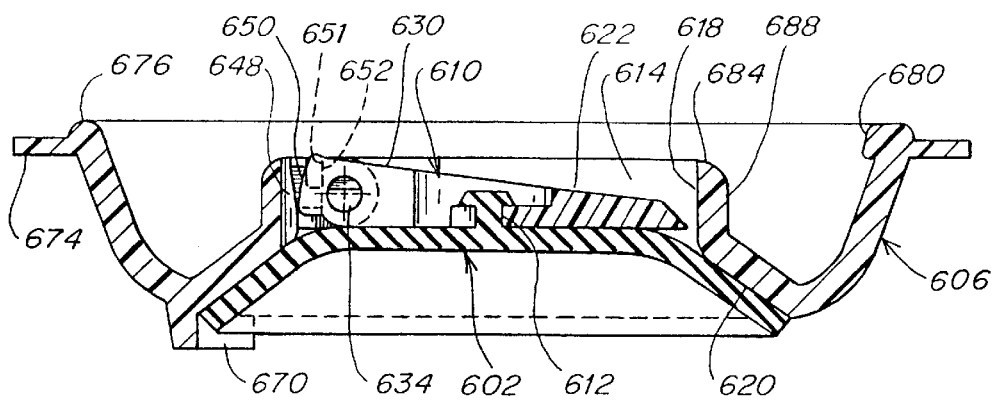
FIGS. 52–54 are cross-sectional side views illustrating a seventh and preferred embodiment of self-sealing valve according the invention with cross-sectional side views showing the valve in three states of operation including seated, pressure control, and deflation, respectively.
Figure 53:
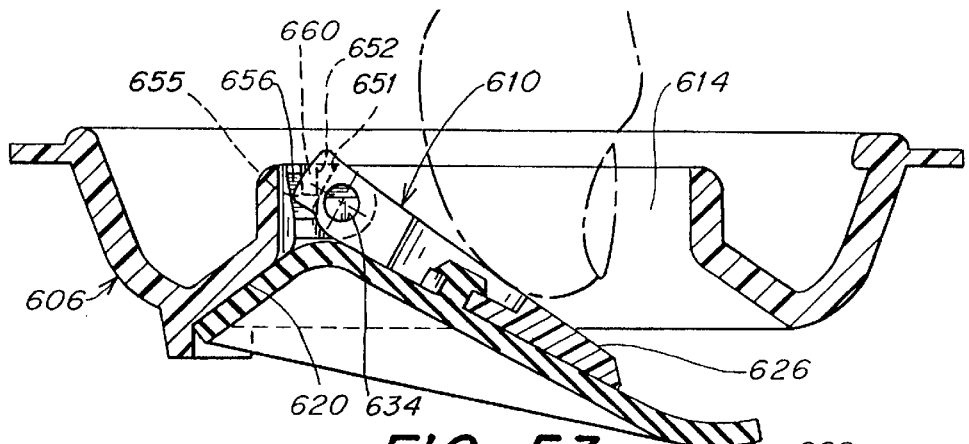
Figure 54:
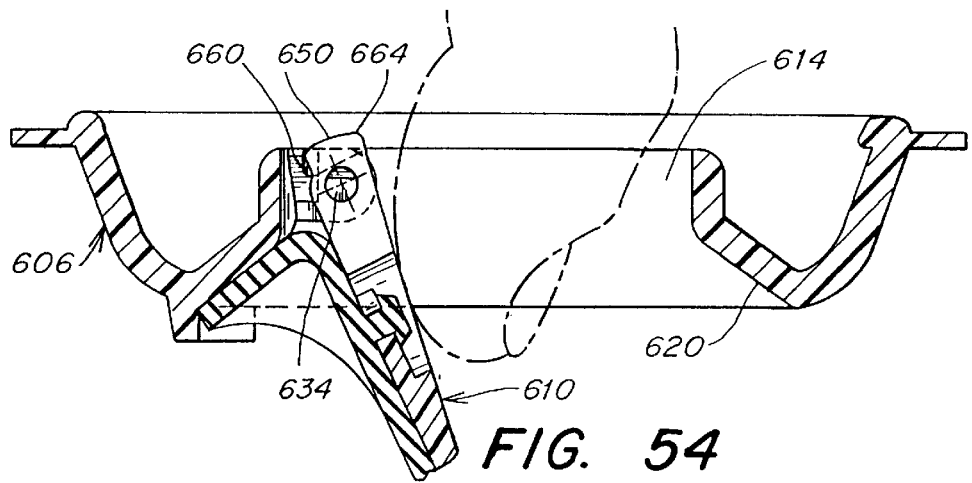

For controlled air release and for deflation, the location of the diaphragm further allows manual partial deflation of the diaphragm away from the valve seat, providing a pathway for exhausting air (See FIG. 51).

The difference between this version of the valve and the previously described version is that the point (or points) of attachment of the valve diaphragm within the valve housing maintain a fixed location with respect to the valve seat. The functionality of the valve diaphragm relies upon a fixed location at the point (points) of attachment while employing the flexibility of the unattached surface of the diaphragm to alternatively provide a seal or an air pathway.

A preferred version of the self-sealing valve of the invention is illustrated in FIGS. 52–61. A diaphragm 602 is positioned within a valve housing 606 by a movable hanger arm 610 which suspends the diaphragm from mounting point 612 in the center of an air inlet 614. The hanger arm is a rotating diaphragm hanger that is removably contained within the air inlet of the valve housing, with one end secured adjacent to an inner wall 618 of the air inlet. A point of attachment of the one end of the hanger arm to the inner wall is configured to allow the hanger arm to pivot downward into the valve housing, a motion which unseats the diaphragm from valve seat 620, a closed position, and opens an airpath, an open position, into a bladder of the inflatable device as required for both inflation and deflation of the inflatable device.

The hanger arm 610 flares outward towards the inner wall of the air inlet creating a "paddle" surface 622 which overspreads much of the air inlet 614. The paddle surface of the hanger arm provides stability to the flexible diaphragm as it rotates with the hanger arm from the closed position to the open position. The expanded paddle surface of the hanger arm also enhances manipulation of the hanger arm by, for example, a fingertip of a user to, for example, control a pressure of the inflatable device. The paddle surface projects outward to a point 626, extending the length of the hanger arm. This projection bears upon the flexible diaphragm, thereby preventing it from flexing upward when the hanger arm is pressed downward for pressure control or deflation.

Figure 58:

Referring to FIG. 58, the hanger arm incorporates a pair of projecting tabs 630, in parallel juxtaposition, extending from the paddle surface 622 towards the inner wall 618 of the air inlet 614. The hanger arm can be secured within the air inlet by seating holes 633 found in each of the projecting tabs with a pair of hinge "pins" 634 that mate with the seating holes. The pair of hinge "pins" are formed as part of the inner walls of the air inlet, projecting from two brackets 636 which extend inward from the inner wall towards the center of the air inlet. There is a contoured section 648 between the hinge "pins" of the inner wall of at least one of the brackets and the inner wall of the air inlet. The contoured section interfaces with a contoured end 650 of the projecting tabs to provide at least four distinct interaction possibilities. A first possibility exists when surface 651 on the projecting tabs bears on surface 652 of the inner wall, restricting rotation of the arm above a horizontal position, thereby securing the valve diaphragm in a substantially closed position and preventing the hanger arm and diaphragm from moving out of the valve housing.

A second possibility exists when beveled surface 655 on the projecting tab bears on counter-beveled surface 656 on the wall. An inclined angle of this counter-beveled surface causes the projecting tab to increasingly compress inward as the hanger arm is pressed downward into the valve housing. This may occur both during inflation (by air pressure) and deflation (by manual deflection of the hanger arm to unseat the valve from the valve seat). The compression of the projecting tab also results in a counter action, so that, with removal of the downward pressure the tab "springs" back to its original position and forces the hanger arm and diaphragm to return to the closed position.

Figure 60:
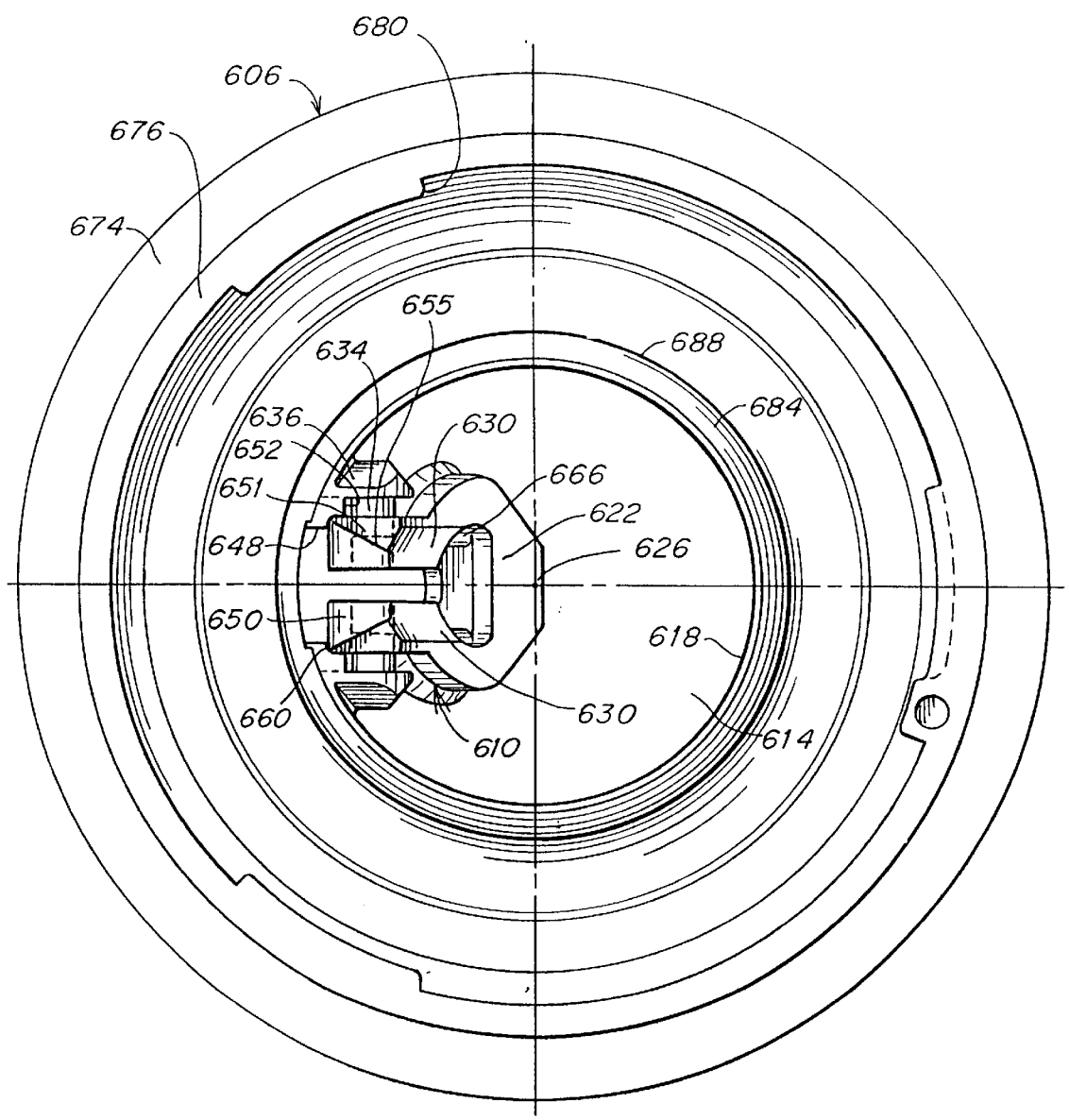
FIG. 60 is a top view showing the hanger arm of the valve of FIG. 52 in a locked open position.

Referring to FIG. 60, a third interaction possibility exists when the hanger arm is depressed fully, the projecting tabs rotate slightly beyond the beveled surface 656 (See FIG. 57) on the inner wall to a point where there is a recess 660 in the inner wall contour which is configured to allow the tabs to expand slightly and lock the rotating arm in a locked open position.

This locked open position maximizes airflow through the valve housing and will, under certain conditions, improve efficiency of both inflation and deflation. The locked open position has an easy override which responds to, for example, fingertip manipulation (by applying pressure at, for example, projecting point 664 on the projecting tab), or to internal pressurization of the inflatable device.

Figure 59:
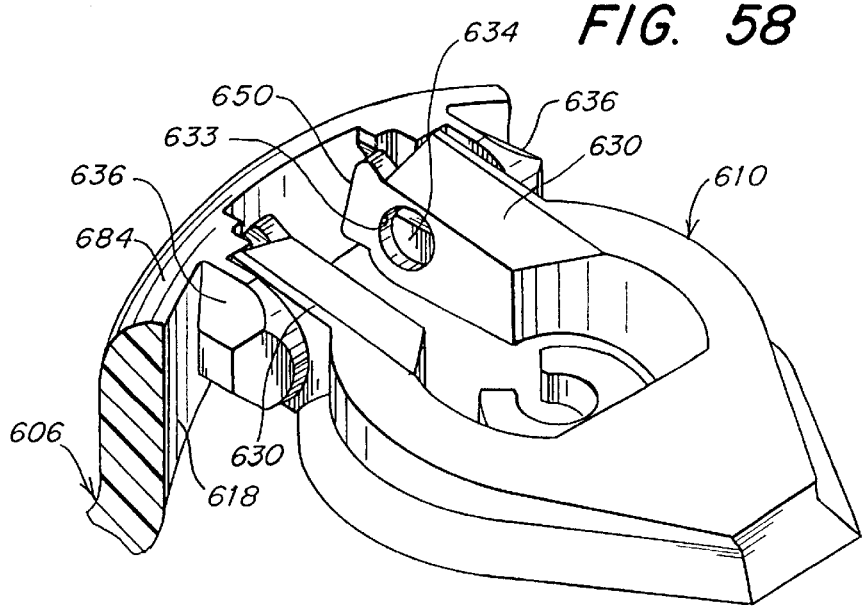
FIG. 59 illustrates a portion of an inlet wall and the hanger arm of the valve of FIG. 52 in an operating position.
Figure 61:
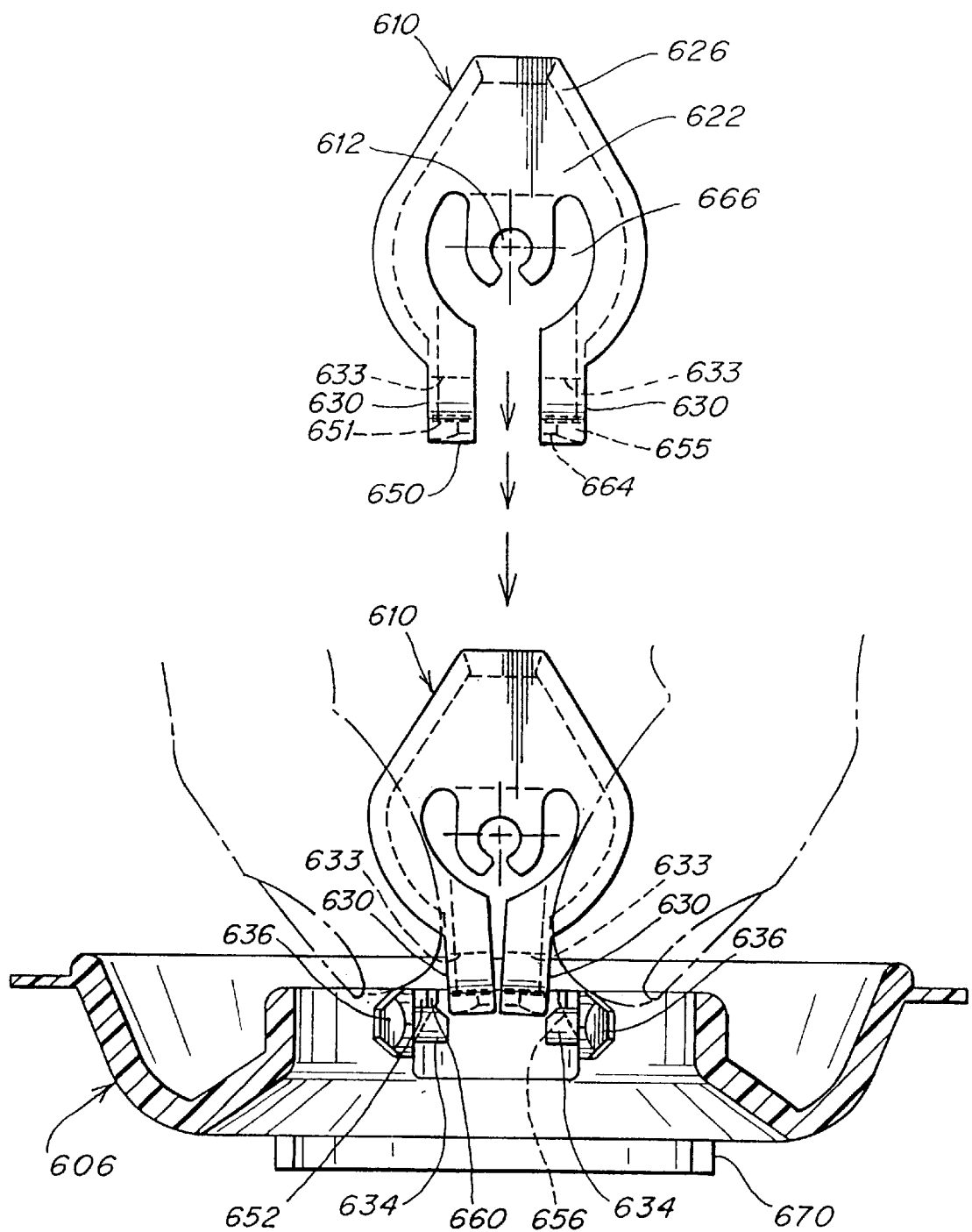
FIG. 61 illustrates the hanger arm of the valve of FIG. 52 during installation into the valve housing.
Figure 62:
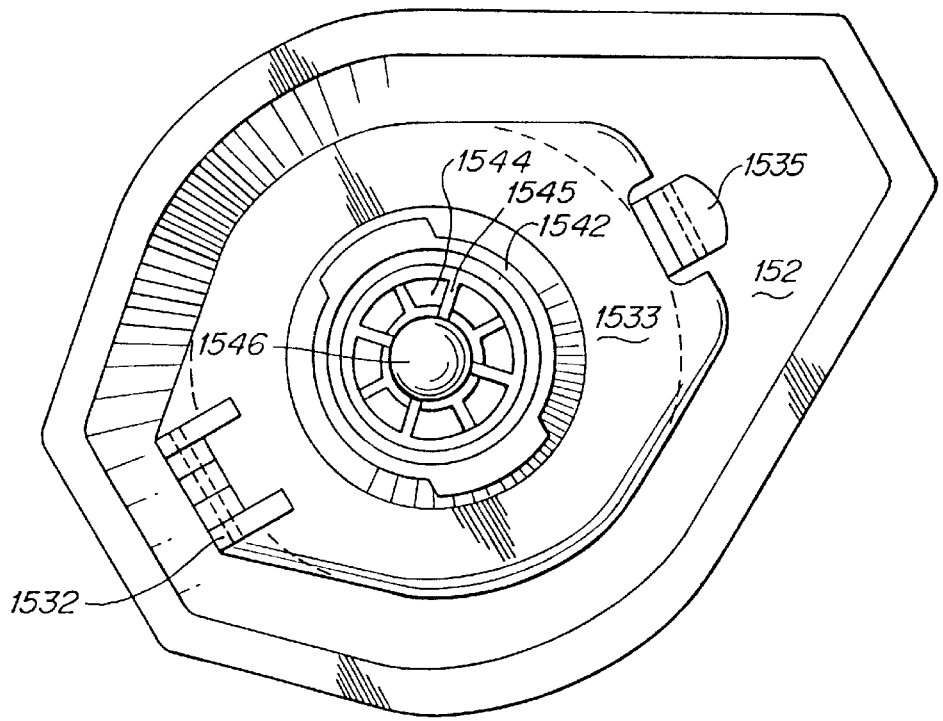
FIGS. 62 illustrates a top view of a self-sealing valve of the related art.
Figure 63:
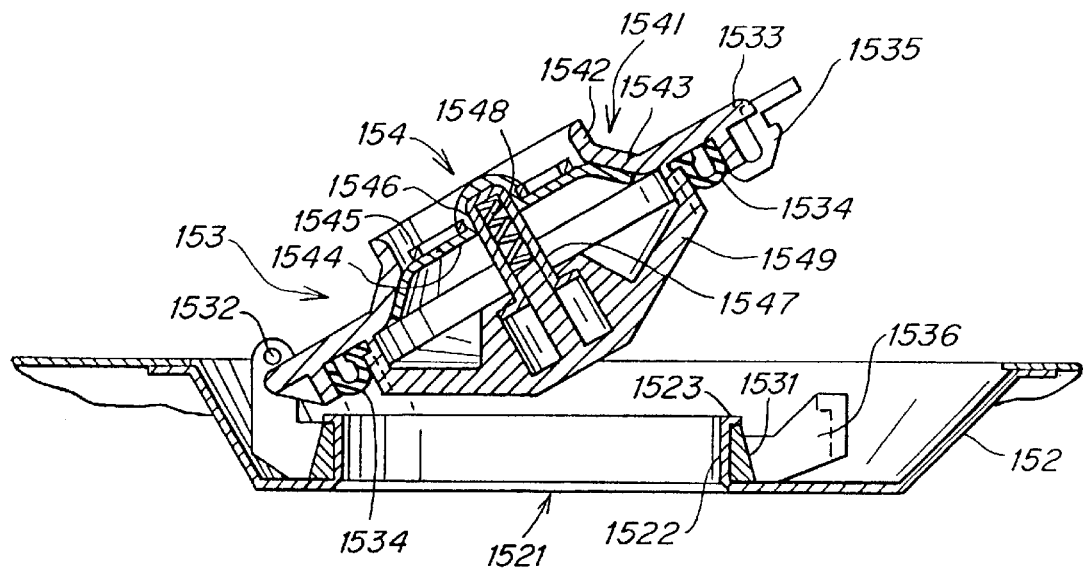
FIG. 63 illustrates a cross-sectional view of a self-sealing valve according to the related art.

The projecting tabs of the rotating arm may also be extended by a channel 666 within the hanger arm to enhance side-to-side flexure of the hanger arm. The flexure of the hanger arm may be used both for the operation of the arm, as previously described, and for installation and removal of the arm into and out of an operating position within the valve housing as illustrated in FIG. 59. It is useful that the hanger arm be removable/reinstallable in the field by the user, thus it is contemplated that the arm will be held by the user (with the attached diaphragm) and that the user will employ the flexure of the projecting tabs by "squeezing" the projecting tabs, to install and/or remove the hanger arm and diaphragm. The contoured end 650 of the projecting tabs, combines with the contoured section 648 of the inner wall to allow the arm to be inserted above the horizontal position into the valve housing as illustrated in FIG. 61, thereby improving accessibility and ease of installation of the arm. During installation, the "squeezed" hanger arm may be inserted in a vertical orientation with the projecting tabs projected into the air inlet towards the hinge "pins" 634. With alignment of the seating holes and hinge "pins", the user will release pressure on the projecting tabs, whereby they will spring outward and engage with the hinge "pins". As the hanger arm and diaphragm are then rotated downward into the valve housing beyond the horizontal position, the projecting tabs will further expand, seating the hanger arm in the operating position, where the hanger arm contoured end 650 and the contoured inner wall 648 prevent movement of the hanger arm above the horizontal position.

It is also to be appreciated that for the purpose of installation of the hanger arm and diaphragm, the projecting tabs contoured end and the contoured section of the inner wall will combine so as to, at least for part of the installation, automatically compress the projecting tabs as the hanger arm is "slid" by the user into position, thereby eliminating any requirement for "squeezing" the hanger arm.

It is further contemplated that the projecting tabs contoured end and the contoured section of the inner wall will combine so as to locate the seating holes and hinge "pins" in alignment without requiring that the user visually direct the movement of the hanger arm to the point of alignment.

Thus, the pivot point, and the contour of the hanger arm projecting tabs work in combination with the contoured section of the inner wall to stabilize the activity of the valve diaphragm within the valve housing so as:

A) to restrict movement of the diaphragm thereby preventing outward movement of the diaphragm into or through the air inlet (as may occur with pressurization), and preventing inward movement of the diaphragm through the valve housing into the inflatable device;

B) to secure the diaphragm alternatively in an open and a closed position;

C) to suspend the diaphragm in a substantially closed position while allowing it to flutter from a partially open to a sealed condition in response to external or internal pressure; and D) to facilitate installation and removal of the rotating arm and diaphragm by the user.

An alternative version of this embodiment of the self-sealing valve incorporates a partial rib 670 projecting from the bottom side of the valve housing, concentric with, and adjacent to a portion of the edge of the flexible diaphragm. As the diaphragm flexes downward (or inward), the diaphragm edge bears upon the rib, providing resistance which works with the resilience of the diaphragm to help urge the diaphragm back to the horizontal (sealed) position.

Figure 55:
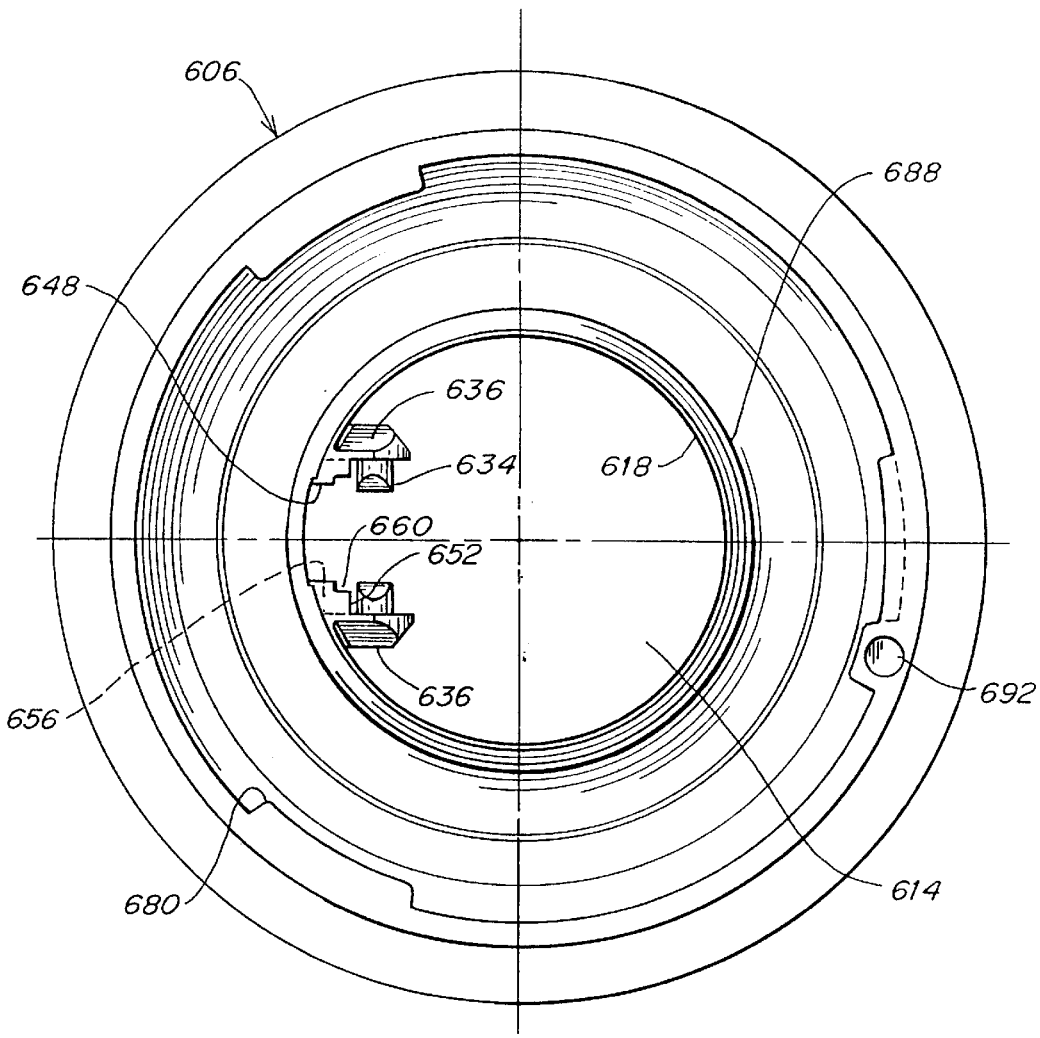
FIGS. 55 and 56 are top views of the valve of FIG. 52, showing the valve without and with the hanger arm and diaphragm, respectively.
Figure 56:
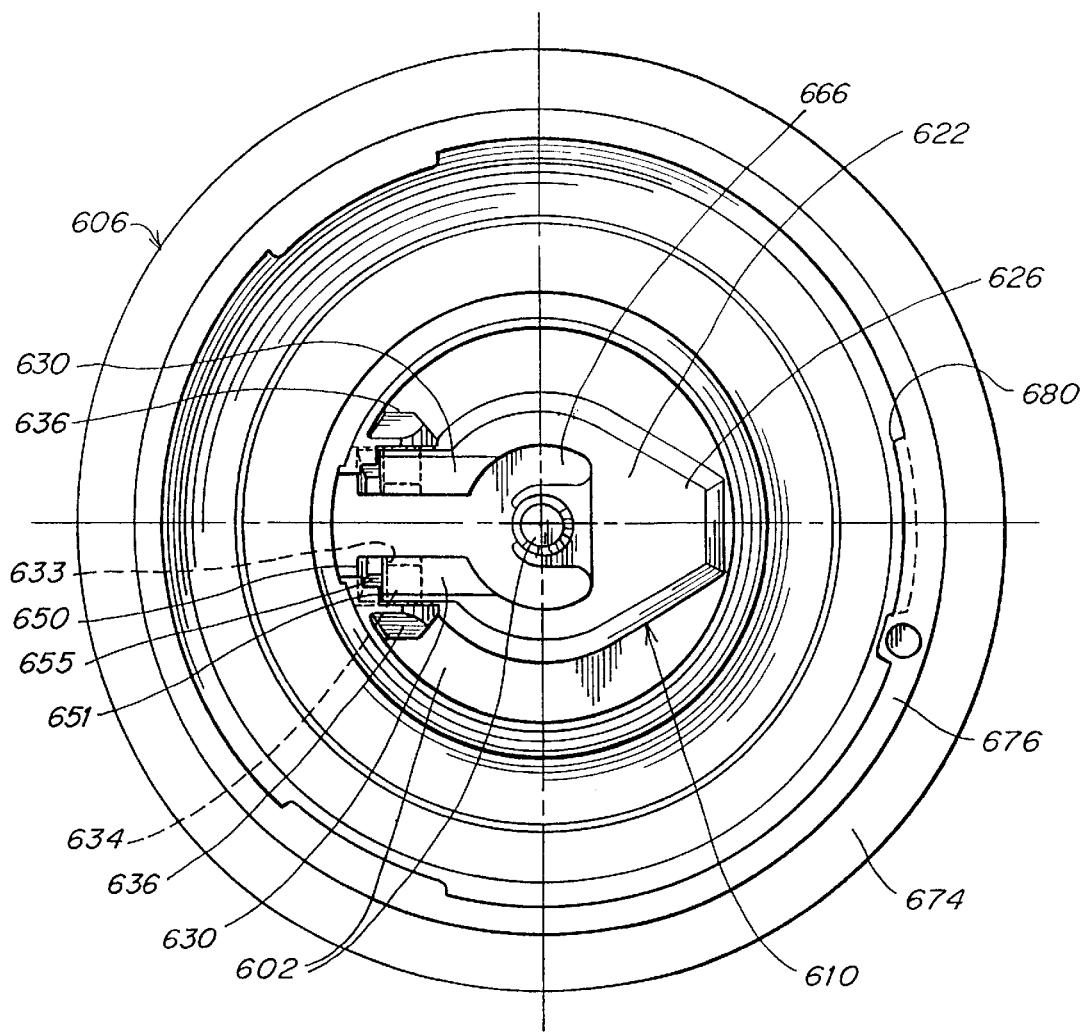
Figure 57:
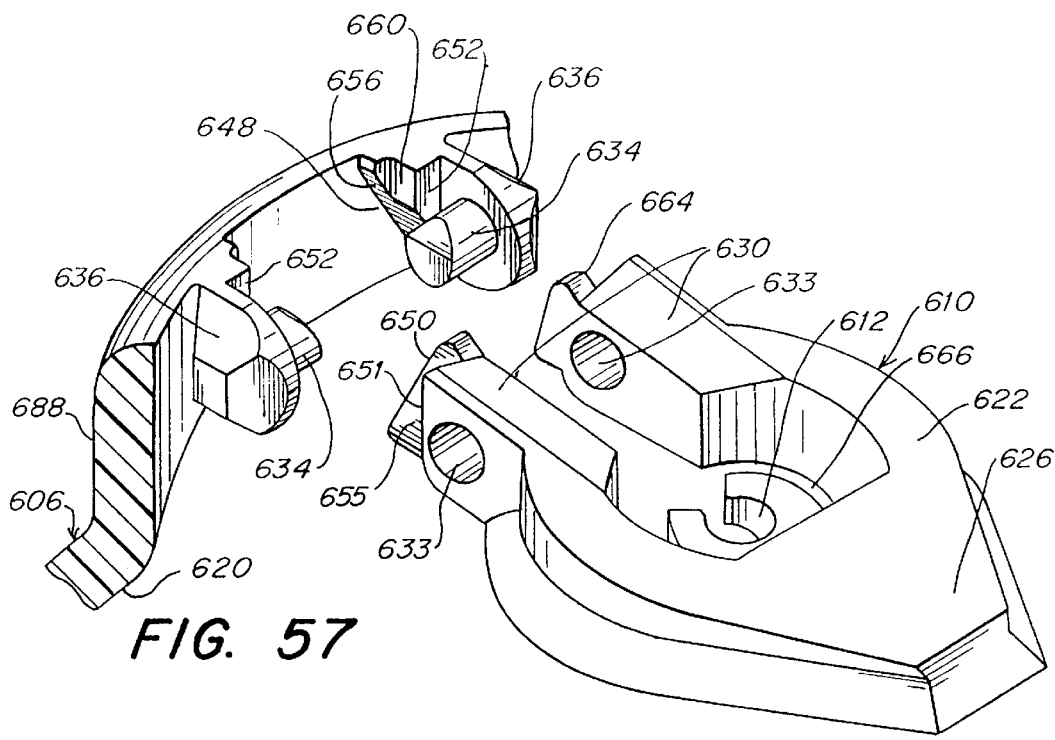
FIGS. 57 and 58 show a portion of an inlet wall not mated and a hanger arm, respectively, of the valve of FIG. 52.

Still another version of this embodiment includes structure for connecting the valve housing 606 to any inflation device, such as, for example, a hand pump, a foot pump, a powered pump, an extension air duct from a remote pump source, and the like. Referring to FIGS. 55–56, the perimeter of the valve housing is formed by a flange 674 which serves as a point of attachment to the port of the inflatable body. Adjacent an interior to the flange is an outer rim 676. The rim includes projecting tabs 680, (or threads, etc.) for the purpose of removably connecting the valve and the inflation source. These projecting tabs or threads engage with mating tabs or threads which may be integral to any pump, adapter, or air duct connector. With engagement, the rim 684 (see FIG. 60) of the air inlet becomes compressively engaged (in contact with) a mating rim integral to the pump, adapter, or air duct connector, providing a substantially sealed connection. It is further envisioned that, as an alternative structure for connecting the valve housing to an inflation device, the outer wall 688 (See FIG. 60) of the air inlet could incorporate "threads" or other structures for attachment or mounting, either directly or indirectly, to any inflation/deflation source known to those of skill in the art. It is further envisioned that the above-described embodiment of the self-sealing valve may be provided with a cover, the cover affording additional protection/security to the valve's exposed hanger arm and diaphragm. Referring to FIG. 55, this embodiment of the self-sealing valve may include the cavity 692 located near the perimeter of the valve housing for attaching a removable cover to the inflatable device (for covering and protecting the air inlet). The cover may include a mating plug which, when inserted into the hole, would serve to retain the cover with the device, whether or not the cover is in use.

It is to be appreciated that for each of the above embodiments of the self-sealing valve of the present invention the rim of the valve housing may be removable or, in other words, is not integral to the valve housing so that the air inlet of the valve can be either permanently or removably attached to the valve housing.

It is to be appreciated that each of the above-described self-sealing valves are simple to operate, inexpensive, support inflation, deflation and pressure control in any low pressure, medium pressure or relatively high pressure inflatable device. In addition, each of the above described self-sealing valves do not require mechanical structure to seal the inflatable device and do not require manual sealing of the inflatable device. In other words, sealing of the inflatable device is automatic and done under the internal pressure of the inflatable device so that each of the above-described valves is self-sealing.

Each of the above-described self-sealing valves also lack any structure below the flexible diaphragm, or in other words, each of the above self-sealing valves suspend the flexible diaphragm in a floating position with a structural member. It is an advantage of each of the above self-sealing valves that the valves allow unrestricted flexure of the diaphragm during inflation thereby increasing air flow.

Each of the above-described self-sealing valves also are easy to use since they automatically open and automatically seal in response to an influx of air and are normally biased to a closed position, and can also be biased to the closed position in response to pressure within an object to be inflated. In addition, the flexible diaphragm of each of the above-described self-sealing valves can be easily manipulated so that the inflatable object can be deflated or a pressure within the inflatable object can be controlled.

Having described several embodiments of the self-sealing valve of the present invention, it should be apparent to those skilled in the art that other variations, features, and modifications can be made without departing from the scope of the present invention. For example, the size of the opening can be varied in order to accommodate the size of the object to be inflated. For example, in order to provide air to an inflatable building, such as a tennis bubble, the opening may be very large as compared to a valve for use with for example, an inflatable pillow. The valve may also be provided with an extension tube for connection over the opening 26 to facilitate manual or oral inflation.

What is claimed is:

1. A self-sealing valve, comprising:
    a valve housing having a fluid inlet, a valve seat, and the valve housing being configured to pass fluid between an interior and an exterior of the valve housing through the fluid inlet;
    a valve assembly that provides a self-seal of the fluid inlet, including:
        a support member that suspends a flexible diaphragm in a floating position, allows movement of at least a part of a periphery of the flexible diaphragm in a first direction away from the valve seat to an open position, and allows movement of the at least the part of the periphery of the flexible diaphragm in a second direction, opposite of the first direction, so that the periphery of the flexible diaphragm engages against the valve seat in a closed position;

the flexible diaphragm having an area larger than an area of the fluid inlet, having a first surface facing the interior of the valve housing and having a second surface facing the valve seat, the second surface including the periphery of the flexible diaphragm that engages against the valve seat to provide the self-seal; and means for mounting the flexible diaphragm to the support member and for facilitating the movement of the at least the part of the periphery of the flexible diaphragm in the first direction and the second direction.

2. The self-sealing valve as claimed in claim 1, further comprising a container having an interior, an exterior, a port for transferring fluid between the interior and the exterior, and a wall separating the interior and the exterior, and wherein the valve housing is attached to the wall proximate to the port of the container so that fluid being transferred between the interior and the exterior of the container passes through the fluid inlet of the valve housing.

3. The self-sealing valve as claimed in claim 2, further comprising a means for maintaining the flexible diaphragm within the valve housing during any of fluid injection, fluid release, pressure control and self-sealing of the valve.

4. The self-sealing valve as claimed in claim 2, wherein the valve housing has a first part that includes a lip disposed about a perimeter of the valve housing and that may be attached to the container wall, and a second part coupled to the first part and that includes the valve seat and the fluid inlet.

5. The self-sealing valve as claimed in claim 2, wherein the support member and the flexible diaphragm are constructed and arranged so that an act of fluid injection into the container is sufficient to cause the at least the part of the periphery of the flexible diaphragm to move in the first direction into the open position to permit an influx of fluid into the container.

6. The self-sealing valve as claimed in claim 5, further comprising a means for maintaining the flexible diaphragm in the closed position in absence of one of fluid pressure within the container and fluid injection into the container.

7. The self-sealing valve as claimed in claim 2, wherein the valve housing is flush mounted to the wall of the container so that an exterior surface of the valve housing and the valve assembly are either substantially coplanar with or beneath the wall of the container.

8. The self-sealing valve as claimed in claim 2, wherein the valve housing and the valve assembly are constructed and arranged so that a fluid pressure created within the container is sufficient to maintain the at least the part of the periphery of the flexible diaphragm against the valve seat when there is an absence of the influx of fluid.

9. The self-sealing valve as claimed in claim 2, wherein the valve housing is a single piece that includes a lip disposed about a perimeter of the valve housing and that may be directly attached to the container wall.

10. The self-sealing valve as claimed in claim 1, further comprising a stiffening means for reducing a flexing of the flexible diaphragm except for the at least the part of the periphery of the flexible diaphragm.

11. The self-sealing valve as claimed in claim 1, wherein the support member includes a hinge assembly disposed between one end of a hanger arm that suspends the flexible diaphragm in the floating position and a wall of the valve housing so that the hanger arm and the flexible diaphragm are pivoted in the first direction and the second direction.

12. The self-sealing valve as claimed in claim 1, wherein the support member includes a hanger arm attached to a wall of the valve housing, the hanger arm having a slot including increased diameter openings at each end of the slot that allows a compressible handle of the flexible diaphragm to be any one of retained within the increased diameter openings and moved in the sideways direction along the slot; and a spring mounted hinge disposed between one end of the hanger arm and the wall of the valve housing and a latch assembly disposed between a second end of the hanger arm and the wall of the valve housing, so that the hanger arm and the flexible diaphragm may be moved about a hinge point of the hinge in the second direction towards the exterior of the valve assembly when the diaphragm handle has been moved sideways within the slot to one of the increased diameter openings to compress a spring of the spring mounted hinge and unlatch the latch assembly.

13. The self-sealing valve as claimed in claim 1, wherein the support member includes a retaining rib that extends across the fluid inlet of the valve housing between the valve seat, the flexible diaphragm including a vertical support post which mates with the retaining rib and extends into the fluid inlet towards the exterior.

14. The self-sealing valve as claimed in claim 13, wherein the flexible diaphragm includes a target area disposed on the second surface of the flexible diaphragm that can be biased under pressure applied to the target area so that the periphery of the flexible diaphragm can be pivoted in the first direction about the vertical support post.

15. The self-sealing valve assembly as claimed in claim 14, further comprising a locking means for locking the target area of the flexible diaphragm in a locked open position to further enhance the purge of the self-sealing valve.

16. The self-sealing valve as claimed in claim 1, wherein the support member includes at least one rib attached to a wall of the valve assembly, the at least one rib having an aperture disposed therein and wherein the diaphragm has a mating projection from the second surface, the mating projection having a section that mates with the aperture and an enlarged section that secures the diaphragm to the at least one rib.

17. The self-sealing valve as claimed in claim 1, wherein the self-sealing valve assembly comprises two pieces, the hanger arm and the flexible diaphragm.

18. The self-sealing valve as claimed in claim 1, wherein the flexible diaphragm is suspended from the support member so that no structure exists under the flexible diaphragm.

19. The self-sealing valve as claimed in claim 1, wherein the valve assembly and valve housing are constructed and arranged to provide non-axial movement of the at least the part of the periphery of the flexible diaphragm in the first direction and in the second direction.

20. The self-sealing valve as claimed in claim 1, wherein the valve assembly and valve housing are constructed and arranged to provide axial movement of the at least one part of the periphery of the flexible diaphragm in the first direction and in the second direction.

21. The self-sealing valve as claimed in claim 1, wherein the valve housing and the valve assembly enable a high volume of fluid transfer over a low pressure range between the interior and the exterior of the valve housing.

22. The self-sealing valve as claimed in claim 1, wherein the valve assembly is constructed and arranged so that substantially any part of the flexible diaphragm may be contacted to regulate the transfer of the fluid between the interior and the exterior of the self-sealing valve.

23. The self-sealing valve as claimed in claim 1, wherein the valve housing and the valve assembly are constructed and arranged so that the valve assembly has a plurality of interactive positions with the valve housing.

24. The self-sealing valve as claimed in claim 1, wherein the valve assembly and the valve housing are constructed and arranged so that the valve assembly may be removed and replaced with another valve assembly.

25. The self-sealing valve as claimed in claim 1, further comprising a means for connecting and disconnecting the valve housing to a fluid injection, release, or pressure control device.

26. The self-sealing valve as claimed in claim 1, further including a protective cover assembly that selectively covers and exposes the fluid inlet.

27. The self-sealing valve as claimed in claim 1, wherein the support member is flexible and moves axially in the first direction and in the second direction along an axis that is parallel to a length of the fluid inlet.

* * * * *